(12) United States Patent
Stopp et al.

(10) Patent No.: US 12,321,875 B2
(45) Date of Patent: Jun. 3, 2025

(54) CARD FORMING METHOD AND APPARATUS

(71) Applicant: Cricut, Inc., South Jordan, UT (US)

(72) Inventors: Grayson Stopp, San Francisco, CA (US); Jeremy Burton Crystal, Springville, UT (US)

(73) Assignee: Cricut, Inc., South Jordan, UT (US)

( * ) Notice: Subject to any disclaimer, the term of this patent is extended or adjusted under 35 U.S.C. 154(b) by 412 days.

(21) Appl. No.: 17/757,081

(22) PCT Filed: Dec. 11, 2020

(86) PCT No.: PCT/US2020/064540
§ 371 (c)(1),
(2) Date: Jun. 9, 2022

(87) PCT Pub. No.: WO2021/119445
PCT Pub. Date: Jun. 17, 2021

(65) Prior Publication Data
US 2023/0010551 A1 Jan. 12, 2023

Related U.S. Application Data

(60) Provisional application No. 62/947,467, filed on Dec. 12, 2019.

(51) Int. Cl.
*B65H 45/04* (2006.01)
*B65H 35/00* (2006.01)
*B65H 37/06* (2006.01)
*B65H 45/28* (2006.01)
(Continued)

(52) U.S. Cl.
CPC ... *G06Q 10/063118* (2013.01); *B65H 35/002* (2013.01); *B65H 37/06* (2013.01);
(Continued)

(58) Field of Classification Search
CPC .. B26F 1/18; B42D 15/04; B26D 3/08; B26D 7/06; B26D 7/20; B65H 35/002;
(Continued)

(56) References Cited

U.S. PATENT DOCUMENTS 4,288,533 A 9/1981 Poshkus
7,435,209 B2 * 10/2008 Kimura ............... B42D 15/02
493/380
(Continued)

FOREIGN PATENT DOCUMENTS

CN 101417567 A 4/2009
JP 2006088420 A 4/2006
(Continued)

OTHER PUBLICATIONS

International Search Report and Written Opinion relating to Application No. PCT/US2020/064540, dated Apr. 1, 2021.
(Continued)

*Primary Examiner* — Leslie A Nicholson, III
(74) *Attorney, Agent, or Firm* — Honigman LLP; Grant Griffith

(57) ABSTRACT

A method inserting a first portion of a workpiece material between an upper layer and a lower layer of a workpiece support material. The method also includes folding a second portion of the workpiece material over and on top of the upper layer of the workpiece support material. The second portion is coupled to the first portion. The method further includes inserting the workpiece material and the workpiece support material into an electronic cutting machine.

9 Claims, 18 Drawing Sheets

(51) Int. Cl.
  *G05B 19/18* (2006.01)
  *G06F 16/27* (2019.01)
  *G06Q 10/0631* (2023.01)
  *G06Q 50/00* (2012.01)

(52) U.S. Cl.
  CPC ............ *B65H 45/04* (2013.01); *B65H 45/28* (2013.01); *G05B 19/182* (2013.01); *G06F 16/27* (2019.01); *G06Q 50/01* (2013.01); *B65H 2301/45* (2013.01); *B65H 2701/1123* (2013.01); *G05B 2219/36115* (2013.01)

(58) Field of Classification Search
  CPC ........ B65H 37/06; B65H 45/04; B65H 45/28; B65H 2301/45
  USPC .............................................. 270/21.1, 52.17
  See application file for complete search history.

(56) References Cited

U.S. PATENT DOCUMENTS

| | | | | |
|---|---|---|---|---|
| 7,841,276 | B2* | 11/2010 | Eckert | B41F 13/56 270/41 |
| 8,137,781 | B2 | 3/2012 | Dangami | |
| 8,156,852 | B2* | 4/2012 | Shibata | B26D 7/2628 83/881 |
| 2005/0186010 | A1 | 8/2005 | Shibata et al. | |
| 2005/0253321 | A1 | 11/2005 | Kimura et al. | |
| 2012/0192733 | A1* | 8/2012 | Angevine | B44B 5/026 101/26 |

FOREIGN PATENT DOCUMENTS

| | | |
|---|---|---|
| KR | 10-2006-0041985 A | 5/2006 |
| WO | 2013011279 A2 | 1/2013 |

OTHER PUBLICATIONS

China National Intellectual Property Administration. Office Action relating to application No. 202080092824.X, dated May 18, 2023.
International Preliminary Report on Patentability relating to Application No. PCT/US2020/064540, dated Jun. 23, 2022.
Instituto Nacional da Propriedade Industrial (Brazilian Patent Office). Office Action received Mar. 11, 2025, relating to Application No. BR112022011505-9.

* cited by examiner

CARD FORMING METHOD AND APPARATUS

CROSS-REFERENCE TO RELATED APPLICATIONS

This U.S. patent application claims priority to PCT Application No. PCT/US2020/064540, designating the United States of America, filed on Dec. 11, 2020, which claims the priority under 35 U.S.C. § 119(e) from, U.S. Provisional Application 62/947,467, filed on Dec. 12, 2019. The disclosures of these prior applications are considered part of the disclosure of this application and are hereby incorporated by reference in their entireties.

TECHNICAL FIELD

The disclosure generally relates to card forming systems, methods, and apparatus. In particular, the present disclosure relates to card forming mats and methods of use thereof.

BACKGROUND

This section provides background information related to the present disclosure and is not necessarily prior art.

Throughout history, individuals have found a sense of personal fulfillment, achievement, satisfaction, and expression by creating art. In recent times, during the late $19^{th}$ century, an art reform & social movement led by skilled tradesmen was slowly starting to be recognized by many people across America, Canada, Great Britain and Australia. This movement has often been referred to as the "arts-and-crafts movement."

The so-called arts-and-crafts movement that began many years ago has continued to evolve today by many persons that may not necessarily be skilled in a particular trade. As such, it may be said that non-skilled persons may be involved in the arts-and-crafts as a social activity or hobby. In some circumstances, the activity or hobby may be practiced for any number of reasons ranging from, for example: economic gain, gifting, or simply to pass time while finding a sense of personal fulfillment, achievement, satisfaction, and expression.

With advances in modern technology, the "arts-and-Crafts Movement" that began many years ago is susceptible to further advancements that may enhance or improve, for example, the way a skilled or non-skilled person may contribute to arts-and-crafts. Therefore, a need exists for the development of improved components, devices and the like that advance the art.

For example, methods and tools for making customized cards, such as greeting cards and the like, remains an area of interest for skilled and non-skilled crafters that needs improvement. Current methods and tools for making cards in the prior art are inefficient and cumbersome. Persons crafting at home, with portable or home-use tools and cutting machines, are especially susceptible to inefficient processes because of the small scale of tools available for home-crafters.

For example, typical electronic cutting machines used at home are limited in size, having available cutting widths in the range of about six or twelve inches. With such limitations, it may be impossible to make large cards as desired and/or it may take an inconveniently long time to make a large number of customized cards. Thus, it is difficult to cut, inscribe, or otherwise form cards with precision, accuracy, and simplicity in bulk using tools and methods currently available in the prior art, especially when using hand tools or electronic cutting machines designed for home use.

Accordingly, there are a number of technical problems in the art that can be addressed.

SUMMARY

This section provides a general summary of the disclosure, and is not a comprehensive disclosure of its full scope or all of its features.

Implementations of the present disclosure relate generally to card forming systems, methods, and apparatus. In particular, the present disclosure relates to card forming mats and methods of use thereof. For example, in one embodiment of the present disclosure, a method of forming a card includes providing a card and a card mat. The card mat has an upper barrier layer and a lower layer. At least a portion of the card can be inserted between the upper and lower layers of the card mat and the remaining portion of the card is folded over and on top of the upper layer of the card mat. The method also includes altering the remaining portion of the card disposed on top of the upper layer of the card mat.

In one embodiment of the present disclosure, a method of forming a card includes: inserting a first portion of a card between an upper barrier layer and a lower layer of a card mat; folding a second portion of the card mat over and on top of the upper barrier layer; and inserting the card and card mat together into an electronic cutting machine with the second portion of the card facing up.

In one embodiment of the present disclosure, a card mat configured to assist in a forming of one or more cards includes an upper layer and a lower layer. At least a portion of the upper layer is separable or separated from the lower layer at a distance sufficient to allow at least a portion of a card to be inserted therebetween during use.

In one embodiment of the present disclosure, a card mat configured to assist in a forming of one or more cards including an upper sheet and a lower sheet. A first portion of the upper sheet is separable from the second sheet and a second portion of the upper sheet is secured to the lower sheet via an adhesive layer.

One aspect of the disclosure provides a method. The method may include inserting a first portion of a workpiece material between an upper layer and a lower layer of a workpiece support material. The method may also include folding a second portion of the workpiece material over and on top of the upper layer of the workpiece support material. The second portion may be coupled to the first portion. The method may further include inserting the workpiece material and the workpiece support material into an electronic cutting machine.

Implementations of this aspect of the disclosure may include one or more of the following optional features. In some implementations, the method includes disposing the second portion of the workpiece material flush against an upper surface of the upper layer of the workpiece support material.

In some implementations, before inserting at least a portion of the workpiece material between the upper layer and the lower layer of the workpiece support material, the method includes separating the upper layer of the workpiece support material from the lower layer of the workpiece support material.

In some implementations, the method includes altering the second portion of the workpiece material.

In some implementations, the upper layer is secured to the lower layer at a first end of the workpiece support material. A portion of the upper layer may be separable from the lower layer.

In some implementations, the upper layer is secured to the lower layer at a second end of the workpiece support material. The portion of the upper layer that is separable from the lower layer may include a portion of the upper layer disposed between the first end and the second end of the workpiece support material where the upper layer is secured to the lower layer.

In some implementations, the workpiece support material further comprises one or more spacers disposed between the upper layer and the lower layer.

Another aspect of the disclosure provides a method. The method may include receiving a workpiece into an electronic cutting machine, The workpiece may include a workpiece support material and a workpiece material. The workpiece support material may include an upper layer and a lower layer opposing the upper layer. The workpiece material may include a first portion and a second portion coupled to the first portion. The first portion may be disposed between the upper layer and the lower layer. The upper layer may be disposed between the first portion and the second portion. The method may also include altering the second portion of the workpiece material with the electronic cutting machine.

Implementations of this aspect of the disclosure may include one or more of the following optional features. In some implementations, the lower layer of the workpiece support material extends laterally beyond edges of the upper layer. The method may further include engaging the lower layer with a roller assembly of the electronic cutting machine, and actuating the workpiece support material forward-and-backward through the electronic cutting machine.

Another aspect of the disclosure provides a workpiece support material. The workpiece support material may include an upper layer and a lower layer. The upper layer may include a first portion and a second portion. The lower layer may oppose the upper layer. The first portion of the upper layer may be separable from the lower layer to allow at least a portion of a workpiece material to be inserted therebetween. The second portion of the upper layer may be secured to the lower layer.

Implementations of this aspect of the disclosure may include one or more of the following optional features. In some implementations, the workpiece support material includes a spacer disposed between the upper layer and the lower layer. The spacer may engage the lower layer and the second portion of the upper layer.

In some implementations, the workpiece support material includes a first spacer and a second spacer. The first spacer may be disposed between first and second layers at a first end of the workpiece support material. The second spacer may be disposed between the first and second layers at a second end of the workpiece support material. The first spacer may be separated from the second spacer by a distance. The upper layer may be fixed to the lower layer via the first spacer. The upper layer may be removably secured to the lower layer via the second spacer.

In some implementations, the workpiece support material includes an adhesive layer disposed on a top surface of the upper layer.

In some implementations, the upper layer is secured to the lower layer at only one end of the workpiece support material.

In some implementations, the upper layer is secured to the lower layer at two opposing ends of the workpiece support material.

In some implementations, the upper layer is transparent or semi-transparent.

In some implementations, the upper layer is a barrier layer configured to protect the portion of the workpiece material disposed between the upper layer and the lower layer of the workpiece support material during use.

Yet another aspect of the disclosure provides a workpiece support material. The workpiece support material may include a lower sheet and an upper sheet. The upper sheet may include (i) a first portion separable from the lower sheet and (ii) a second portion secured to the lower sheet via an adhesive layer.

Implementations of this aspect of the disclosure may include one or more of the following optional features. In some implementations, the workpiece support material includes one or more spacers disposed between the upper sheet and the lower sheet.

In some implementations, the workpiece support material includes a first spacer and a second spacer. The first spacer may be disposed between the upper sheet and the lower sheet at a first end of the workpiece support material. The second spacer may be disposed between the upper sheet and lower sheet at a second end of the workpiece support material. At least a portion of the first portion of the upper sheet that is separable from the lower sheet extends between the first and second spacers. The upper sheet may be secured to the lower sheet at the first spacer. The upper sheet may be secured to the lower sheet at the second spacer.

In some implementations, the workpiece support material includes a first adhesive layer secured to the upper sheet and the lower sheet. The first adhesive layer is disposed between the upper sheet and the lower sheet at a first end of the workpiece support material. The workpiece support material may include a second adhesive layer disposed between the upper sheet and the lower sheet at a second end of the workpiece support material. A portion of the upper sheet not secured to the lower sheet and extending between the first adhesive layer and the second adhesive layer may be separable from the lower sheet.

In some implementations, the lower sheet extends laterally beyond side edges of the upper sheet.

In some implementations, the first portion of the upper sheet is not secured to the lower sheet.

Yet another aspect of the disclosure provides a kit. The kit may include a first workpiece material, a second workpiece material, and a workpiece support material. The first workpiece material may include a first primary portion and a first secondary portion coupled to the first primary portion. The first primary portion may define a first width. The second workpiece material may include a second primary portion and a second secondary portion coupled to the second primary portion. The second primary portion may define a second width greater than the first width. The workpiece support material may include a lower sheet and an upper sheet. The upper sheet may be selectively separable from the lower sheet to define a cavity therebetween. The cavity may be configured to separately receive the first primary portion and the second primary portion.

Each of the above independent implementations of the present disclosure, and those implementations described in the detailed description below, may include any of the features, options, and possibilities set out in the present disclosure and figures, including those under the other independent implementations, and may also include any combination of any of the features, options, and possibilities set out in the present disclosure and figures.

Additional features and advantages of exemplary implementations of the present disclosure will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims or may be learned by the practice of such exemplary implementations as set forth hereinafter.

The details of one or more implementations of the disclosure are set forth in the accompanying drawings and the description below. Other aspects, features, and advantages will be apparent from the description and drawings, and from the claims.

Each of the above independent implementations of the present disclosure, and those implementations described in the detailed description below, may include any of the features, options, and possibilities set out in the present disclosure and figures, including those under the other independent implementations, and may also include any combination of any of the features, options, and possibilities set out in the present disclosure and figures.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims or may be learned by the practice of such exemplary implementations as set forth hereinafter.

DESCRIPTION OF DRAWINGS

In order to describe the manner in which the above-recited and other advantages and features of the present disclosure can be obtained, a more particular description of the disclosure briefly described above will be rendered by reference to specific configurations thereof which are illustrated in the appended drawings. Understanding that these drawings depict only typical configurations of the present disclosure and are not therefore to be considered to be limiting of its scope, the present disclosure will be described and explained with additional specificity and detail through the use of the accompanying drawings in which.

Corresponding reference numerals indicate corresponding parts throughout the drawings.

DETAILED DESCRIPTION

The present disclosure relates generally to card forming systems, methods, and apparatus. In particular, the present disclosure relates to card forming mats and methods of use and provides technical solutions to a number of technical problems in the art discussed above.

For example, in one aspect of card mats disclosed herein, the card mats enable users to create large customized cards by hand or with electronic cutting machines configured for home use. In addition, in one aspect of the present disclosure, methods of use of card mats disclosed herein are simple and repeatable, enabling skilled and novice crafters to produce customized cards in large volumes precisely and accurately.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

Figure 1:
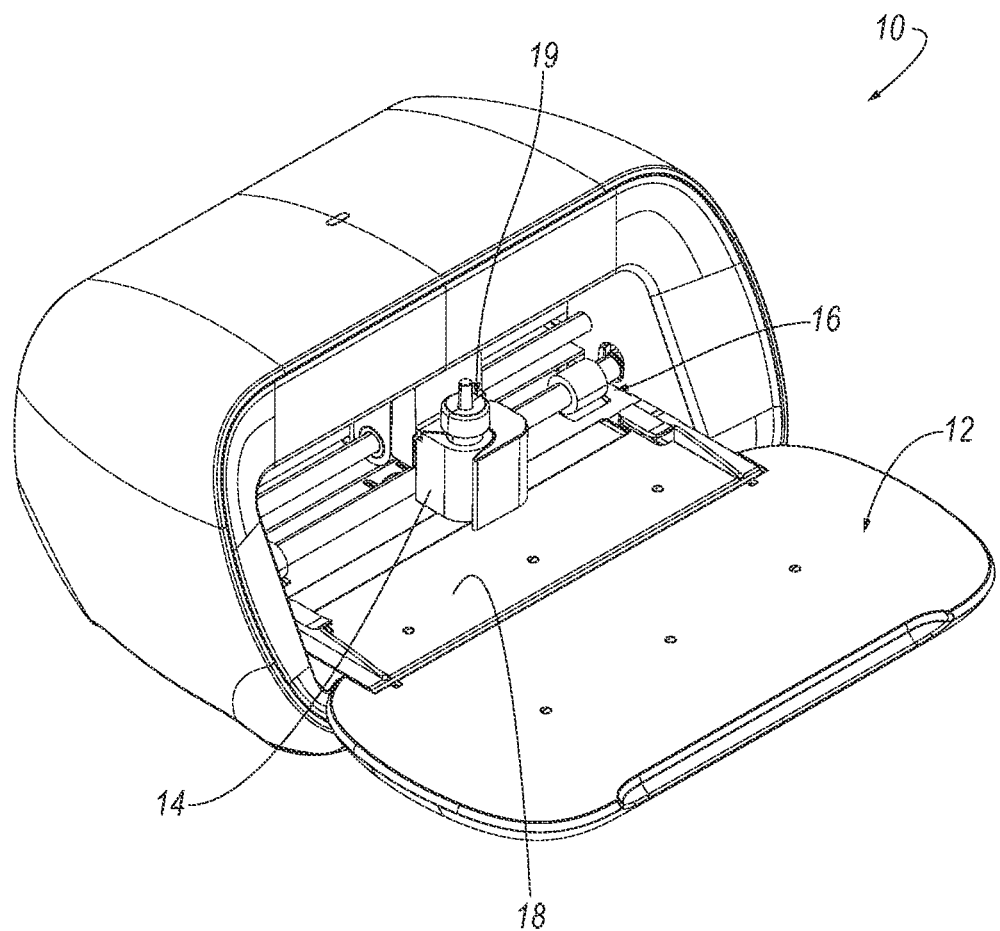
FIG. 1 illustrates a perspective view of a miniaturized cutting machine with the door open to receive material, according to the principles of the present disclosure.

In general, card mats described herein may be configured for use with electronic cutting machines, such as cutting machine 10 shown in FIG. 1. As seen in FIG. 1, the cutting machine 10 includes a door 12 that is configured for arrangement in an open orientation in order to allow a workpiece 50 (e.g., FIG. 5A), which may include, collectively, the workpiece support material 20 of FIG. 2 and exemplary workpiece material 28 seen at FIGS. 5A-5C, to be inserted into the cutting machine 10. The door 12 may be selectively opened and closed via a hinge mechanism (not shown) where the door 12 connects to the cutting machine 10. The cutting machine 10 may also include various internal cutting components, such as, for example, a carriage 14, a tool 19, and a roller assembly 16.

As seen at FIG. 1, the cutting machine also define a working surface 18, a portion of which may define an upwardly-facing surface of the door 12 when the door 12 is arranged in an open configuration. The working surface 18 may provide a surface on which one or both of the workpiece material 28 and the workpiece support material 20 (and/or other implements, such as, for example, other cutting mats) can rest when fed forward and/or backward through the cutting machine 10 by the roller assembly 16. As, for example, one or both of the workpiece material 28 and the workpiece support material 20 is fed forward-and-backward by the roller assembly 16, the carriage 14, which manipulates the tool 19 upwardly-and-downwardly relative to the working surface 18, can move back-and-forth laterally across one or both of the workpiece material 28 and the workpiece support material 20 (and/or other implements, such as, for example, other cutting mats) in order to conduct work on or alter the workpiece material 28.

One or both of the workpiece material 28 and the workpiece support material 20 that is/are fed into the cutting machine 10 may be worked upon or altered in a number of ways, depending on, for example, the type of the tool 19 that may be removably-interfaced with the carriage 14. For example, in some configurations, the tool 19 may include a cutting blade, a scoring tool, an ink pen/marker, or other tools that may be associated with creating arts-and-crafts projects. The workpiece support material 20 disclosed herein is configured to be fed into a machine such as cutting machine 10 illustrated in FIG. 1, as well as other home-use electronic cutting machines. In addition, workpiece support material 20 of the present disclosure is configured to be used without a cutting machine, where a user can alter the material 20 by hand using handheld cutting blades, pens/markers, scoring tools, or other handheld crafting tools.

Figure 2:
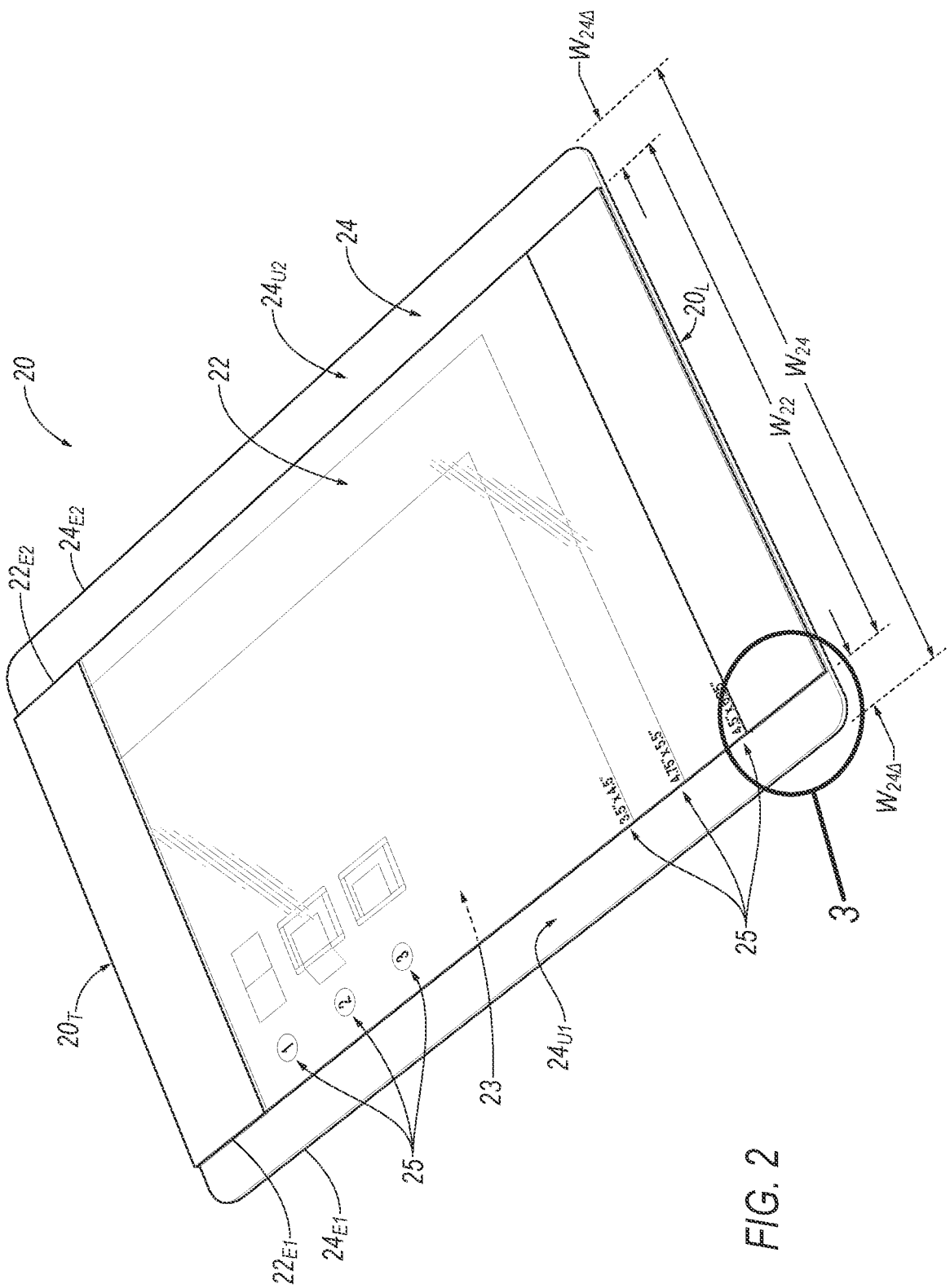
FIG. 2 is a perspective view of an exemplary workpiece support material that is configured for receiving a workpiece and being collectively received by the cutting machine of FIG. 1.
Figure 5A:
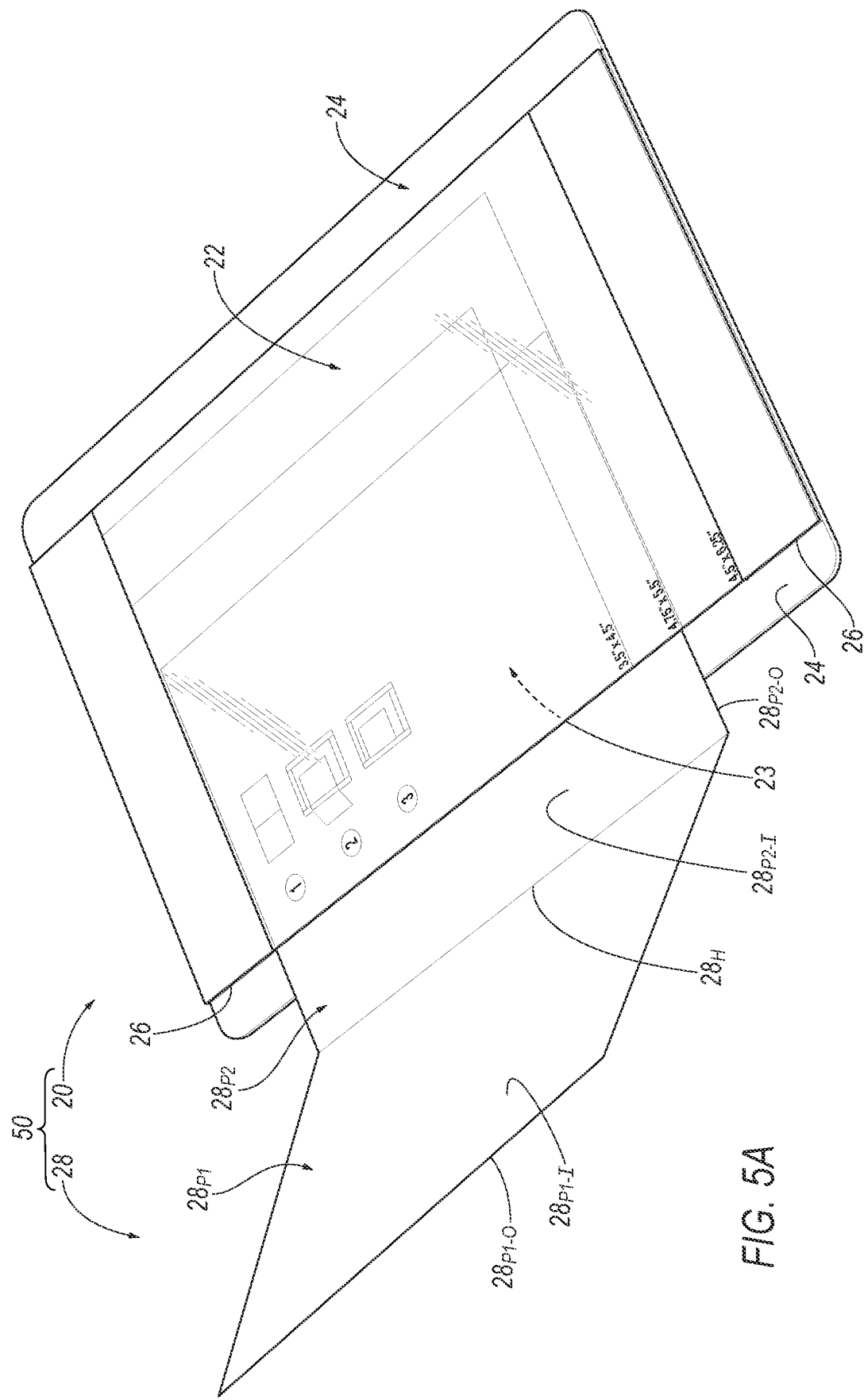
FIG. 5A is a perspective view of an exemplary workpiece defined by an exemplary workpiece material interfaced with, and arranged in a first orientation with respect to, the workpiece support material of FIG. 2, according to the principles of the present disclosure.
Figure 5B:
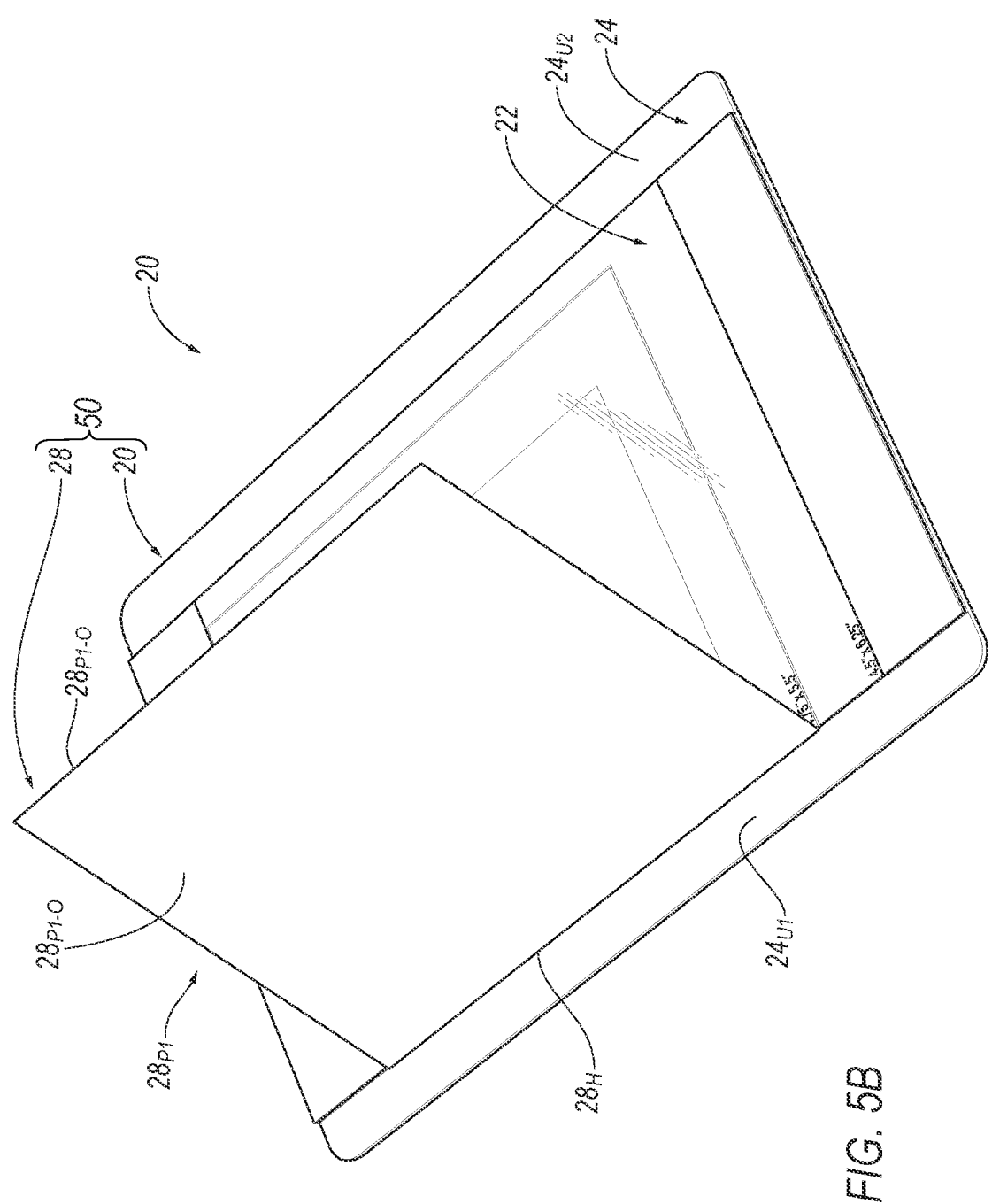
FIG. 5B is a perspective view of the workpiece material of FIG. 5A further interfaced with, and arranged in a second orientation with respect to, the workpiece support material, according to the principles of the present disclosure.
Figure 9:
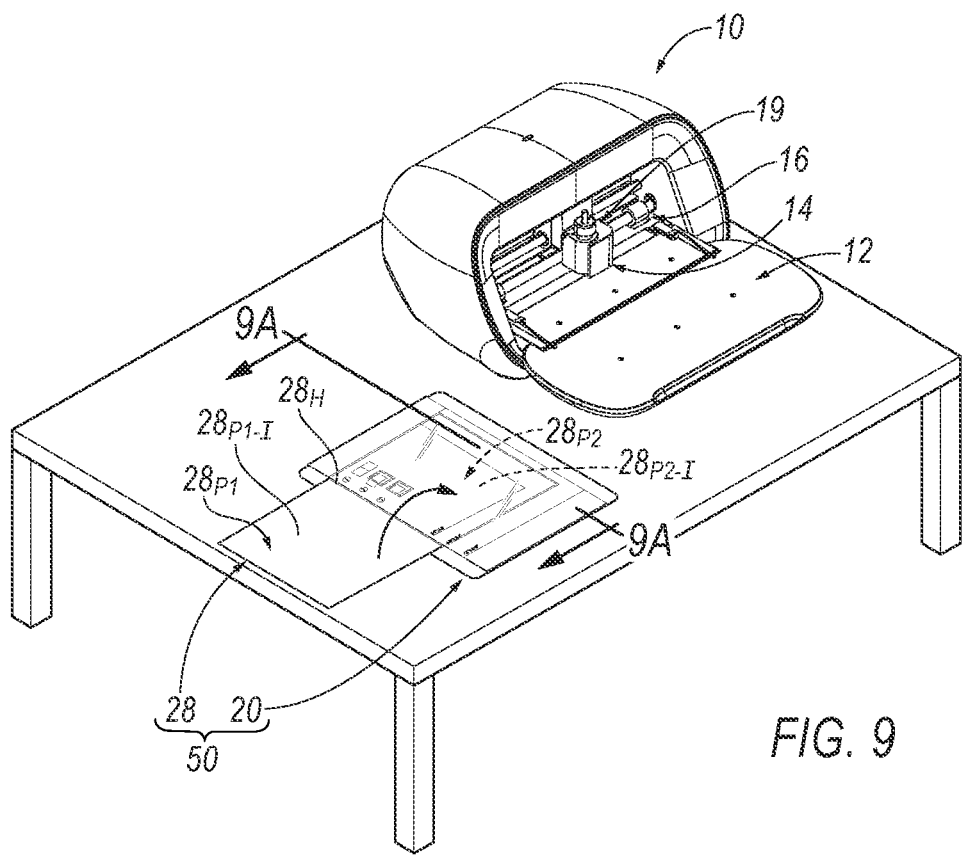
FIG. 9 is a perspective view of a third step of using the system according to FIG. 7.
Figure 9A:
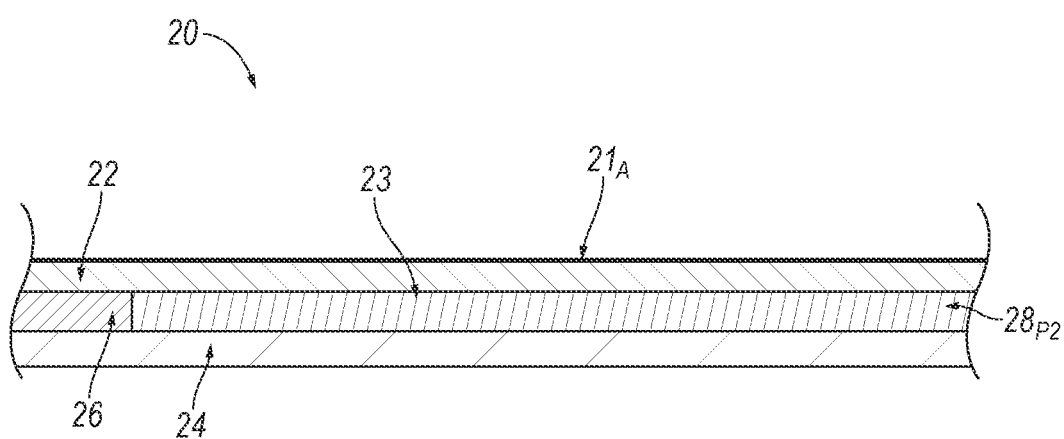
FIG. 9A is a cross-sectional view according to line 9A-9A of FIG. 9.

With reference to FIG. 2, the exemplary workpiece support material 20 may include an upper barrier layer 22 and a lower guiding layer 24 between which at least a portion of workpiece material 28 may be inserted (as seen at, e.g., FIGS. 5A-5B and 9). A remaining portion of the workpiece material 28 that may not be secured between the upper barrier layer 22 and the lower guiding layer 24 may be folded over on top of and above the upper barrier layer 22 of the workpiece support material 20 (as seen at, e.g., FIGS. 5B-5C and 10). Subsequently (as seen at, e.g., FIGS. 10-12), the workpiece support material 20 and the workpiece material 28 may be inserted into a cutting machine (e.g., cutting machine 10) (collectively, together, the workpiece support material 20 and the workpiece material 28 may be referred to as the workpiece 50) such that the remaining portion of the workpiece material 28 that is not secured between the upper barrier layer 22 and the lower guiding layer 24 of the workpiece support material 20 is arranged opposite the tool 19 of the cutting machine 10, such that the tool 19 can impinge upon—for example, cut into—the remaining portion of the workpiece material 28 that is not secured between the upper barrier layer 22 and the lower guiding layer 24 of the workpiece support material 20. For example, the tool 19 may engage the portion of the workpiece material 28 that is disposed upon or on top of the upper barrier layer 22. Accordingly, during a cutting operation performed by the cutting machine 10, the portion of the workpiece material 28 that is disposed between the upper barrier layer 22 and the lower guiding layer 24 is protected from being directly contacted by tool 19 as a result of the intervening arrangement of the upper barrier layer 22 of the workpiece support material 20 between portions of the workpiece material 28.

With reference to FIG. 5A, the workpiece material 28 may be alternatively referred to as a card (e.g., a sheet of material that is folded upon itself to form a living hinge $28_H$ that results in the card 28 including: (1) a front cover panel $28_{P1}$ defining an outer surface $28_{P1-O}$ and an inner surface $28_{P1-I}$; and (2) a rear cover panel $28_{P2}$ defining an outer surface $28_{P2-O}$ and an inner surface $28_{P2-I}$). Accordingly, one or both of the inner surface $28_{P1-I}$ of the front cover panel $28_{P1}$ and the inner surface $28_{P2-I}$ of the rear cover panel $28_{P2}$ of the card 28 may include a note or message from a sender that is intended to be read by a user whereas, for example (as seen at FIGS. 11-14), the front cover panel $28_{P1}$ of the card 28 may be altered or worked-on by the cutting machine 10 in order to define a design (e.g. a cut pattern) that is formed by the tool 19 of the cutting machine 10.

Components of the workpiece material 28 (which may be alternatively referred to as a "card mat") and methods of use thereof will be described in more detail below, but in general, configurations of the workpiece materials 28 described herein reduce the space needed to alter or form a card 28 by a factor of two. That is, the methods and apparatus for cutting the card 28 in the present disclosure may not include the steps of laying a sheet of workpiece material in an unfolded orientation prior to cutting or inscribing a portion of that unfolded workpiece material (that would subsequently form a front cover panel of the unfolded workpiece material), and then subsequently folding the workpiece material to form a hinge such that the workpiece material resembled a card (defined by a front cover panel and a rear cover panel) after the workpiece material is altered or worked upon.

In view of the utilization of the workpiece support material 20, workpiece material 28 may be preformed or pre-purchased in the form of a card that is already folded to define a living hinge $28_H$ prior to being cut by the cutting machine 10, with the rear cover panel $28_{P2}$ of the workpiece material 28 being protected from the tool 19 during a cutting operation performed by the cutting machine 10. As such, the workpiece support material 20 effectively reduces the area needed to form folded workpiece materials (defining a card) having only a one side cut or inscribed on by a factor of two. Thus, methods and apparatus of forming a card described herein enable larger cards to be made more efficiently using relatively smaller (e.g., "home-use") crafting devices such as, for example, the cutting machine 10, where a workspace or professional crafting resources are not available or are more limited than they are in larger, industrial factory setting.

Figure 3:
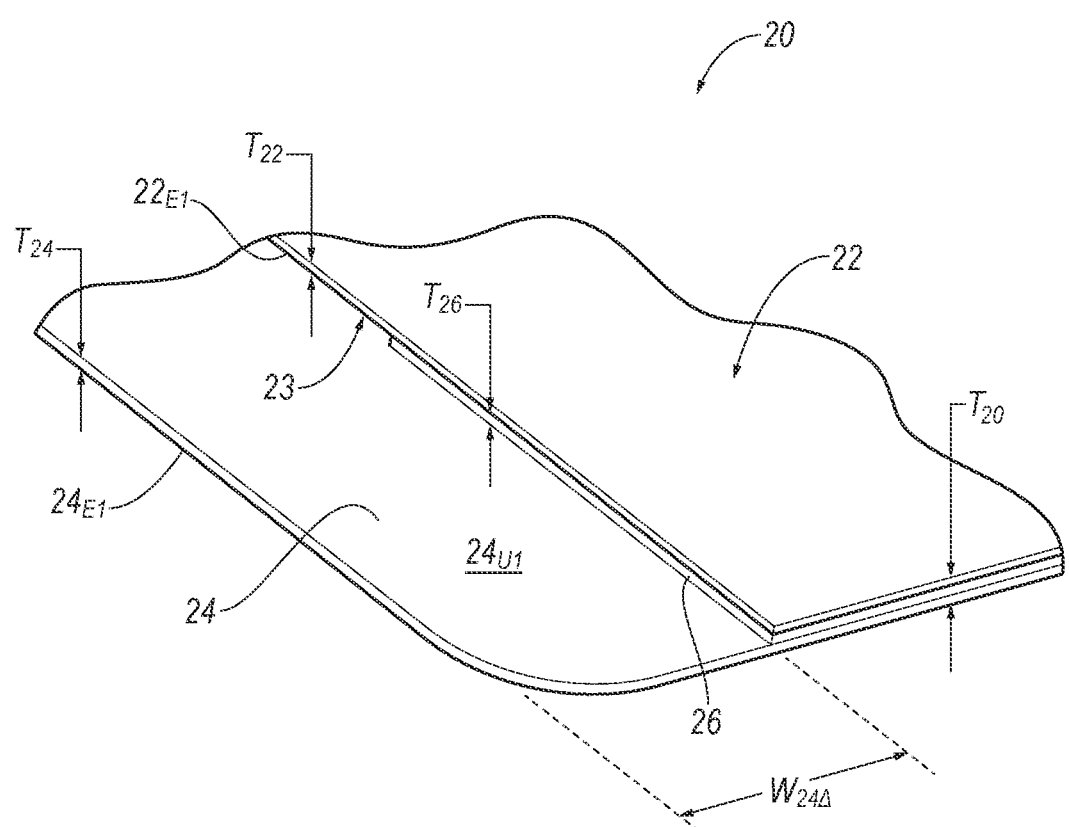
FIG. 3 is an enlarged view of the workpiece support material according to line 3 of FIG. 2.
Figure 4:
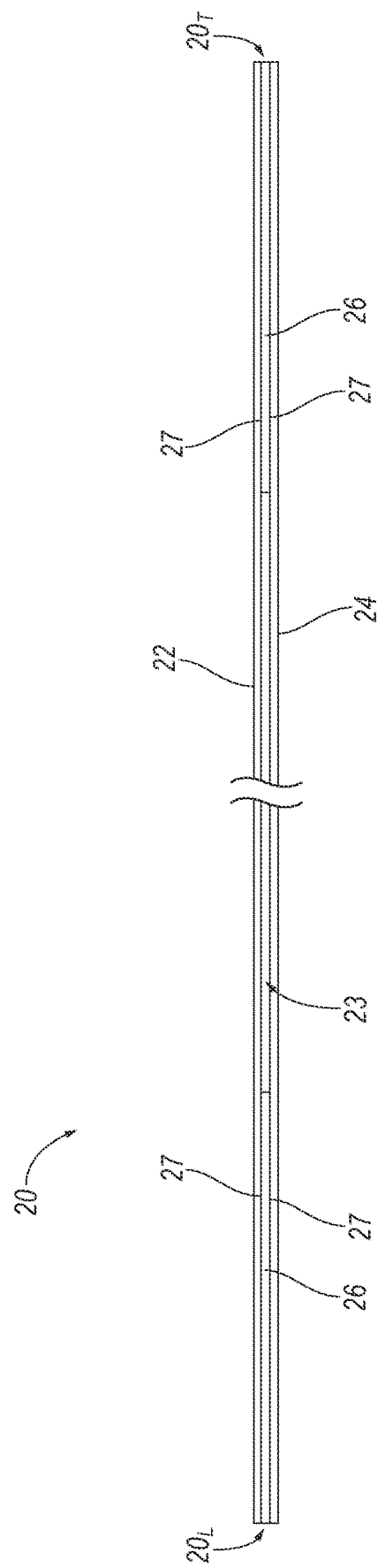
FIG. 4 is a side elevation view of the workpiece support material of FIG. 2 with break-in-length lines indicating an indeterminate length thereof.

Referring to FIGS. 2-4, an exemplary configurations of the workpiece support material 20 may include at least two layers. For example, the workpiece support material 20 may include the upper layer 22 and the lower layer 24. During use, the upper layer 22 may function as a protective layer acting as a wall or barrier that prevents the tool 19, which may include a cutting blade, from impinging onto anything (such as, e.g., the rear cover panel $28_{P2}$ of the workpiece material 28) that is arranged spatially below the upper layer 22 when the workpiece 50 is interfaced with the cutting machine 10 (as seen at, e.g., FIGS. 10-11). In this way, the upper layer 22 also acts as a shield for anything (such as, e.g., the rear cover panel $28_{P2}$ of the workpiece material 28) disposed between the upper layer 22 and the lower layer 24. In this regard, the upper layer 22 may be referred to herein as the "upper barrier layer 22."

In some instances, a thickness (see, e.g., $T_{22}$ at FIG. 3) and material(s) of the upper barrier layer 22 may vary depending on, for example, the type (e.g., hardness) of the workpiece material 28 and/or an amount of force that is used to cut into and/or through the workpiece material 28 (which may be defined by a unique hardness, such as, for example, relatively thicker card stock when compared to relatively thinner paper). In some configurations, for example, the upper barrier layer 22 may be formed of polyvinylchloride (PVC) or other similar plastic, polymer, or other polymeric materials. Accordingly, the thickness $T_{22}$ of the upper barrier layer 22 may not be limited to what is illustrated in the Figures, and, as such, may be greater or lesser, depending on, for example, one or more of a hardness and thickness of the workpiece material 28 that is to be cut by the tool 19 of the cutting device 10. In some implementations, upper barrier layer 22 may be defined by a PVC material and the thickness $T_{22}$ of the upper barrier layer 22 may be within the range of about 0.30 mm to about 0.45 mm when the cutting machine 10 is configured to impart the tool 19 with a downward force of about 400 grams.

In a similar fashion, the lower layer 24 may also be made of any desirable material(s), such as, for example, PVC or other plastic materials. In some configurations, the lower layer 24 may be formed from the same material as that of the upper barrier layer 22 so that both of the upper barrier layer 22 and the lower layer 24 expand or creep to the same extent during or after manufacturing. In other configurations, the upper barrier layer 22 and the lower layer 24 may be formed from different materials. Functionally, the lower layer 24 may be formed to provide structure and form for guiding the workpiece support material 20 through the cutting machine 10 as seen at, for examples, FIGS. 10-11. In this regard, the lower layer 24 may be referred to herein as the "lower guiding layer 24."

Figure 10:
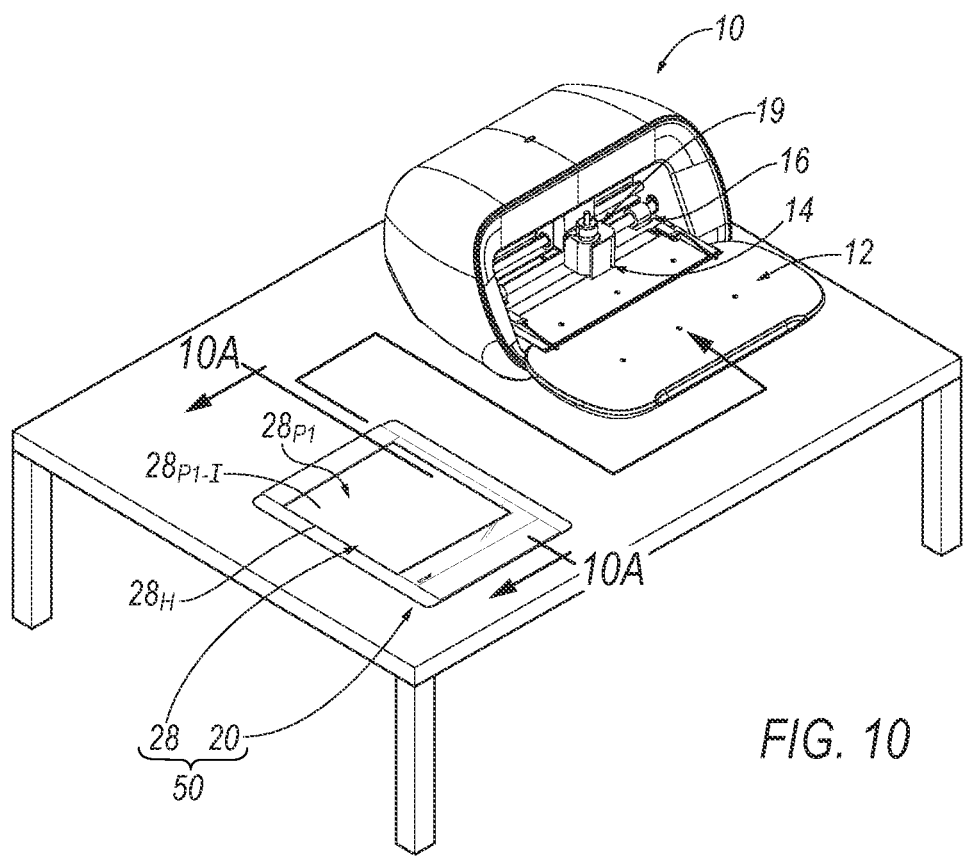
FIG. 10 is a perspective view of a fourth step of using the system according to FIG. 7.
Figure 11:
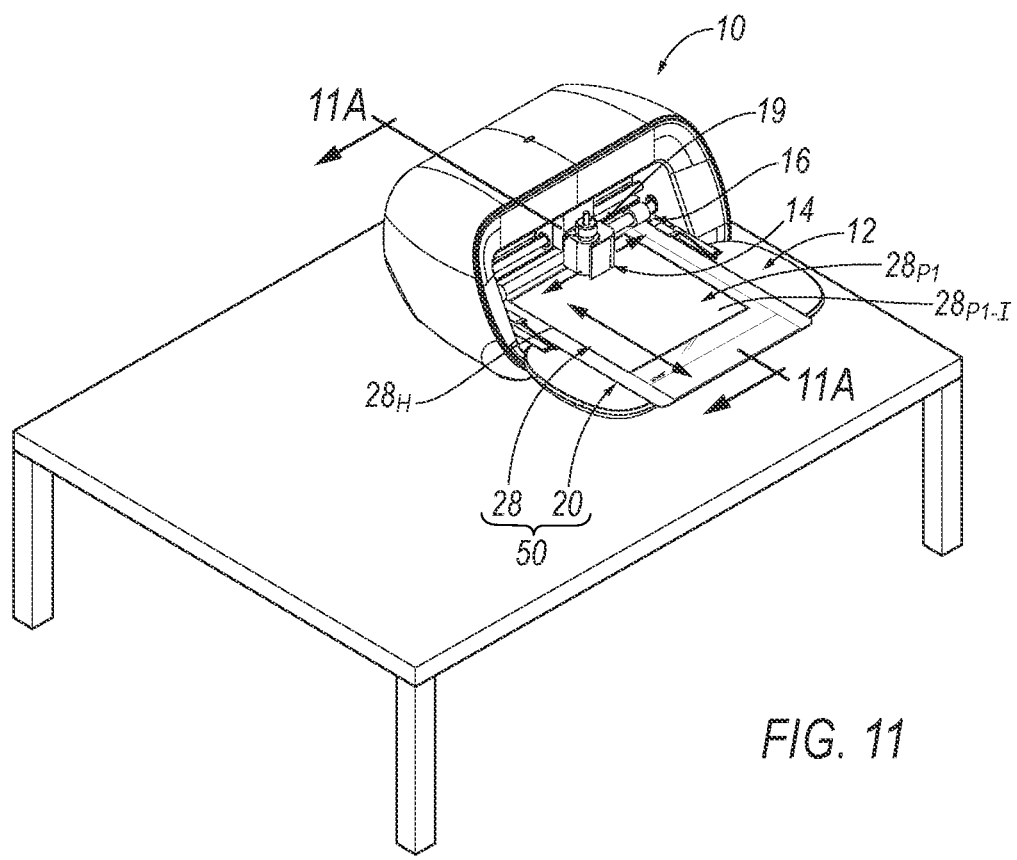
FIG. 11 is a perspective view of a fifth step of using the system according to FIG. 7.
Figure 11A:
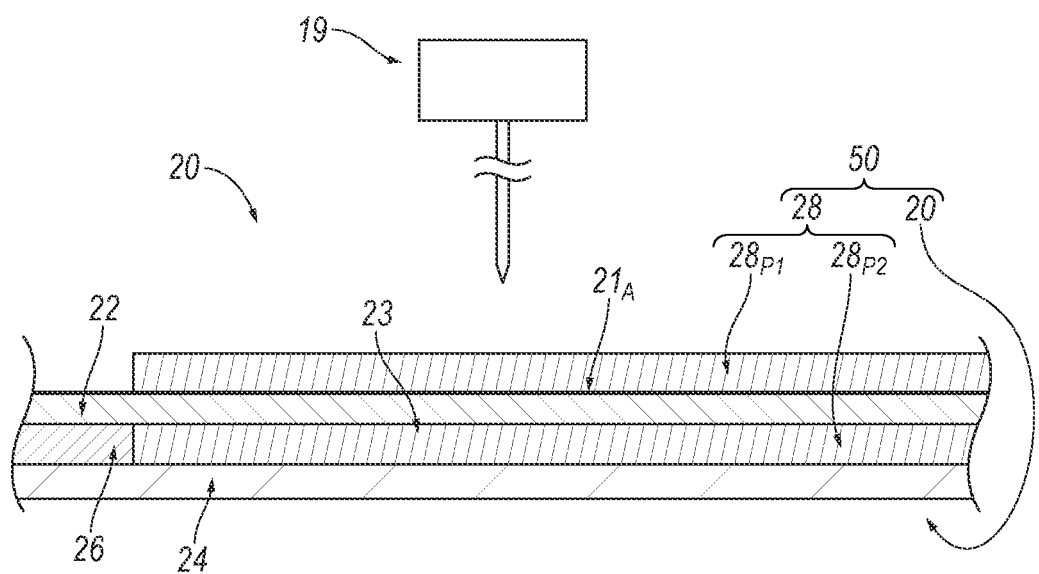
FIG. 11A is a cross-sectional view according to line 11A-11A of FIG. 11.
Figure 12:
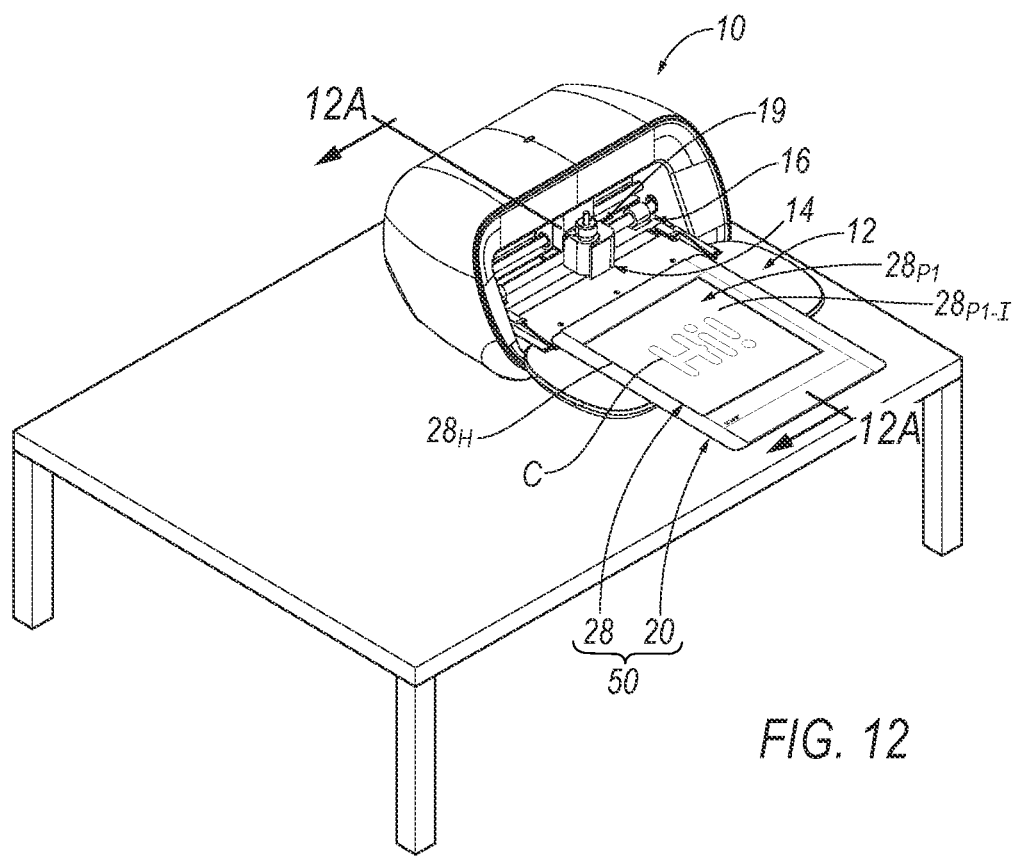
FIG. 12 is a perspective view of a sixth step of using the system according to FIG. 7.
Figure 12A:
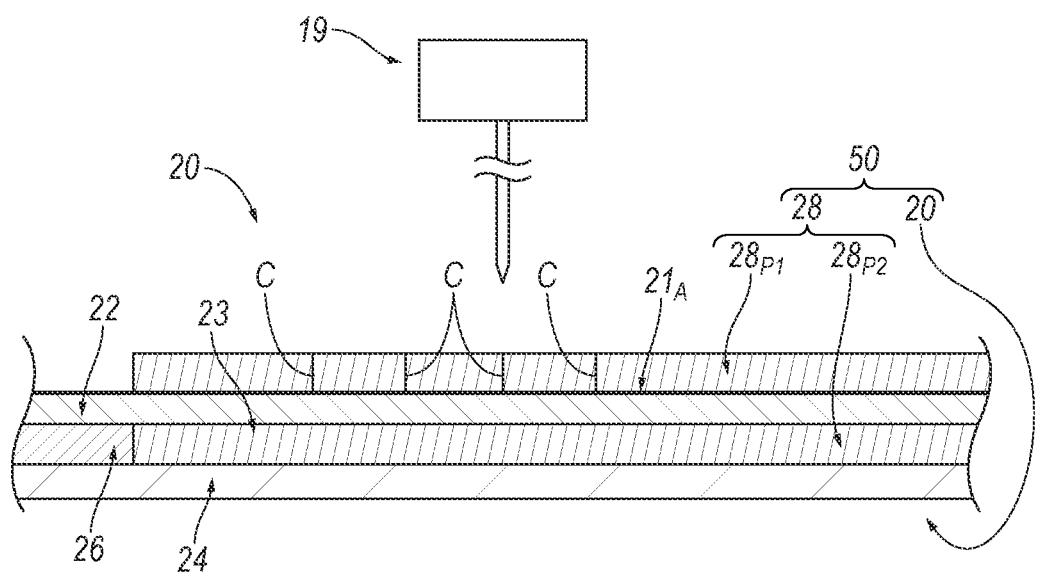
FIG. 12A is a cross-sectional view according to line 12A-12A of FIG. 12.
Figure 13:
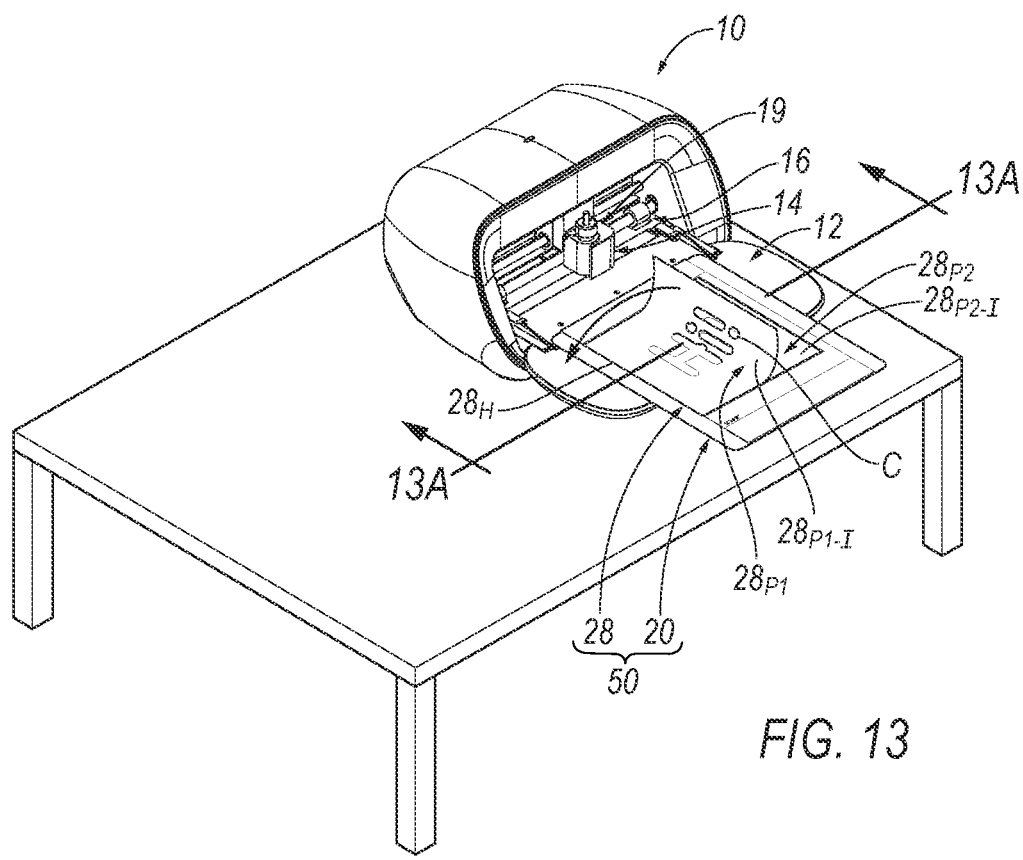
FIG. 13 is a perspective view of a seventh step of using the system according to FIG. 7.
Figure 13A:
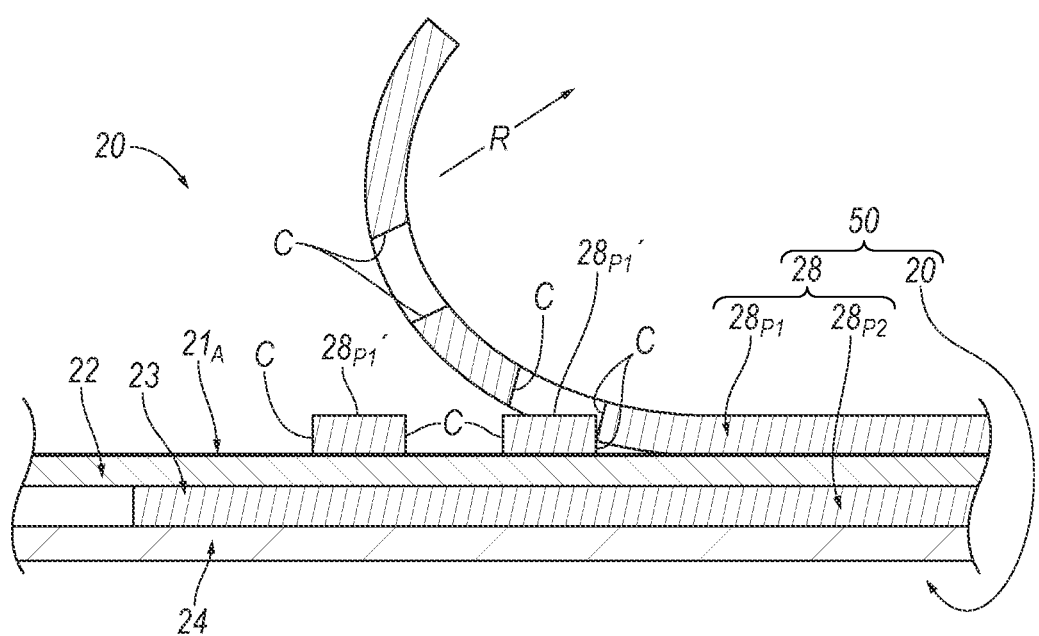
FIG. 13A is a cross-sectional view according to line 13A-13A of FIG. 13.

As seen at, for example, FIG. 2, in some configurations, the lower guiding layer 24 may define a width $W_{24}$ (extending between opposite outer edges $24_{E1}$, $24_{E2}$ of the lower guiding layer 24) that is greater than a width $W_{22}$ (extending between opposite outer edges $22_{E1}$, $22_{E2}$ of the upper barrier layer 22) defined by the upper barrier layer 22. Furthermore, the upper barrier layer 22 may be joined to and centered (in the width direction between the opposite outer edges $24_{E1}$, $24_{E2}$ of the lower guiding layer 24) upon or over the lower guiding layer 24 such that at least one or more width portions (see, e.g., $W_{24A}$) of the width $W_{24}$ of the lower guiding layer 24 extends laterally beyond one or both of the outer edges $22_{E1}$, $22_{E2}$ of the upper barrier layer 22. Accordingly, the one or more width portions $W_{24A}$ of the width $W_{24}$ of the lower guiding layer 24 define one or more upwardly-facing surface portions $24_{U1}$, $24_{U2}$, that may be arranged or configured to be in contact with one or more workpiece-moving portions (e.g., the roller assembly 16) of the cutting machine 10 when the workpiece support material 20 is disposed within the cutting machine 10 as seen at FIGS. 10-11. As such, when the workpiece support material 20 is arranged within the cutting machine 10, the upper barrier layer 22 may not contact, for example, the roller assembly 16 during use, even when the upper layer 22 facing upward as shown. Therefore, in some configurations, the roller assembly 16 may pinch or otherwise contact a region of the lower guiding layer 24 defined at least in part by the upwardly-facing surface portions $24_{U1}$, $24_{U2}$ of the one or more width portions $W_{24A}$ of the width $W_{24}$ of the lower guiding layer 24 when the workpiece 50 is inserted into the cutting machine 10 and moved forwardly-and-backwardly through the cutting machine 10. Such an exemplary configuration also maximizes the available cutting area between the rollers of the roller assembly 16 of the cutting machine 10 (i.e., in some instances, the entire area of the upper barrier layer 22 extending between the opposite outer edges $22_{E1}$, $22_{E2}$ of the upper barrier layer 22, or anything disposed thereover, such as, for example, the front cover panel $28_{P1}$ of the workpiece material 28, is not obstructed by the workpiece support material 20 during a cutting operation or the like as associated with the tool 19.

In some configurations, a thickness (see, e.g., $T_{24}$ at FIG. 3) of the lower guiding layer 24 may vary depending on, for example, the type (e.g., hardness) of the workpiece material 28 and/or an amount of force that is called for in order to cut into and through the workpiece material 28 (which may be defined by a unique hardness, such as, for example, relatively thicker card stock when compared to relatively thinner paper). In some configurations, the thickness $T_{24}$ may be configured to be thick enough to provide form and/or rigidity that promotes, for example, the roller assembly 16 to grasp and guide the workpiece support material 20 through the cutting machine 10. In some instances, the lower guide layer 24 may be formed from a PVC material and may be defined by a thickness $T_{24}$ of the lower guide layer 24 between about 0.40 mm and about 0.60 mm. In other configurations, the lower guide layer 24 may be formed from a PVC material and may be defined by a thickness $T_{24}$ approximately equal to about 0.50 mm.

With reference to FIG. 3, in some implementations, the workpiece support material 20 may further include a spacer 26 disposed between the upper barrier layer 22 and the lower guiding layer 24. In some configurations, the spacer 26 may be defined by a thickness $T_{26}$ between about 0.40 mm and about 0.60 mm. In other configurations, the thickness $T_{26}$ of the spacer 26 may be approximately equal to about 0.50 mm. Functionally, the spacer 26 separates the upper barrier layer 22 from the lower guiding layer 24 so that the workpiece support material 20 defines a void or workpiece-receiving cavity 23 (see also FIG. 4) that is configured or sized to receive at least a portion of the workpiece support material 20, such as, for example, a rear cover panel $28_{P2}$ of the workpiece material 28, which may be defined by, for example, a cardstock material, a paper material, or other card materials. In one or more other configurations, the thickness $T_{26}$ of the spacer 26 may be greater than or less than the thicknesses $T_{22}$, $T_{24}$ of one or both of the upper barrier layer 22 and the lower guiding layer 24 so long as the spacer 26 maintains sufficient spacing between the upper barrier layer 22 and the lower guiding layer 24 so as to form the void or workpiece-receiving cavity 23 that is configured or sized to receive at least a portion of the workpiece support material 20.

With reference to FIG. 4, in some implementations, the workpiece support material 20 may include two spacers 26 that are disposed between the upper barrier layer 22 and the lower guiding layers 24 such that one spacer 26 of the two spacers 26 is arranged at or near a leading end $20_L$ (see also FIG. 2) end and one spacer 26 of the two spacers 26 is arranged at or near a trailing end $20_T$ (see also FIG. 2) of the workpiece support material 20.

In some configurations, the upper barrier layer 22 may be secured to the lower guiding layer 24 at or near the leading end $20_L$ end and/or the trailing end $20_T$ of the workpiece support material 20 with the spacers 26 and/or various intermediate adhesive layers 27 (see, e.g., FIG. 4) disposed between: (1) a lower surface portion of the upper barrier layer 22 and the spacer 26; and (2) an upper surface portion of the lower guiding layer 24 and the spacers 26. In other configurations, the spacers 26 may define one or more adhesive layers that directly adhere or bind the upper barrier layer 22 to the lower guiding layer 24. Alternatively, in yet other configurations, the upper barrier layer 22 and/or the lower guiding layer 24 may be secured together at or by the spacers 26 with one or more layers of pressure sensitive adhesive 27 such that the upper barrier layer 22 and the lower guiding layer 24 do not slip or otherwise move relative to one another during use but are selectively separable by, for example, a user, as needed. Alternatively, in other configurations, the upper barrier layer 22 is selectively-removably-secured to the lower guiding layer 24 at or near one of the leading end $20_L$ end and/or the trailing end $20_T$ of the workpiece support material 20 by one of the two spacers 26 such that a portion of the lower surface of the upper barrier layer 22 can be partially peeled away from a portion of the upper surface of the lower guiding layer 24 while maintaining a connection to a remaining portion of the upper surface of the lower guiding layer 24 at the other spacer 26. Alternatively, in other configurations, the upper barrier layer 22 may not be secured to the lower guiding layer 24 at all, but, rather, may be configured to be at least temporarily secured thereto for use within the cutting machine 10.

Furthermore, in some configurations, the workpiece support material 20 may not include any spacers 26; rather, in such configurations, the upper barrier layer 22 may be adhered, either permanently or semi-permanently to the lower guiding layer 24 directly via one or more adhesive layers 27 at or near one of the leading end $20_L$ end and the trailing end $20_T$ of the workpiece support material 20 of the upper barrier layer 22. In such configurations, the upper barrier layer 22 and the lower guiding layer 24 may be flexed away from one another to form the void or workpiece-receiving cavity 23. Even further, in such implementations, one end of the upper barrier layer 22 at or near one of the leading end $20_L$ end and the trailing end $20_T$ of the workpiece support material 20 may be directly secured to the lower guiding layer 24 with the other end of the upper barrier layer 22 at or near one of the leading end $20_L$ end and the trailing end $20_T$ of the workpiece support material 20 free to be peeled away from the lower guiding layer 24.

Along these lines, some configurations of the workpiece support material 20 may be in the form of an envelope, whereby the upper barrier layer 22 may be secured to the lower guiding layer 24 at or near three edges thereof (i.e., in the event of a rectangularly configured workpiece support material 20). In such configurations, the upper barrier layer 22 may be separated or separable from the lower guiding layer 24 at the edge of the workpiece support material 20 that is not secured together like an envelope. Once separated, a portion of the workpiece material 28 may be inserted into the cavity 23 of the envelope-shaped workpiece support material 20, as will be described in more detail below.

Furthermore, in some implementations, the upper barrier layer 22 and the lower guiding layer 24 may be formed integrally as a single piece of material having two opposing sheets that are separated by some distance along at least a portion of the length of workpiece support material 20. Such an integrally-formed embodiment of the workpiece support material 20, if not formed having sheets with a space there-between, may at least be formed to have opposing sheets that are able to be separated from each other either by flexing, bending, or otherwise separated to insert a portion of the workpiece material 28 there-between.

Exemplary implementations of the workpiece support material 20 described herein may include various combinations of any of the embodiments described herein, and may provide two opposing layers or sheets of material between which another separate sheet (or sheets) of material, such as a portion (e.g. a rear cover panel $28_{P2}$) of the workpiece material 28 that is not being worked on is protected from being cut or otherwise altered by the tool 19 of the cutting machine 10. Also, in general, at least one layer of the workpiece support material 20 described herein may provide a barrier layer that prevents the tool 19a from contacting or at least partially penetrating a portion of the workpiece material 28.

As shown at FIGS. 5A, 8-9, and 8A-9A, at least a portion (e.g. a rear cover panel $28_{P2}$) of the workpiece material 28 may be inserted between the upper barrier layer 22 and the lower guiding layer 24 of the workpiece support material 20. With reference to FIGS. 7-8 and 7A-8A. in some instances, prior to interfacing the workpiece material 28 with the workpiece support material as described above, a film material 21 may be optionally removed from an upper surface of the upper barrier layer 22. In some configurations, film material 21 and the upper barrier layer 22 may be transparent or at least semi-transparent, such that an end user can visualize the portion (e.g. a rear cover panel $28_{P2}$) of the workpiece material 28 disposed between the upper barrier layer 22 and the lower guide layer 24 during use (accordingly, the film material 21 may protect the clear material defining the upper barrier layer 22 from being scratched during shipping, which may adversely affect the benefits associated with the transparency of the upper barrier layer 22 as described above). Additionally, the upper barrier layer 22 and/or the lower guiding layer 24 may include indicia 25 (see also FIG. 2) that may assist the end user for the purposes of guiding and/or aligning the workpiece material 28 between the upper barrier layer 22 and the lower guiding layer 24. The indicia 25 shown in the Figures may include, for example, lines indicating where the edges of various predetermined (or standard) sizes of workpiece materials 28 could be aligned for defining the workpiece 50 when the workpiece 50 is interfaced with the cutting machine 10. The indicia 25 may also be included for providing instructions or other information to end users of the workpiece support material 20.

In some configurations, the indicia 25 may provide for placement or arrangement of three different sizes of workpiece materials 28 that may be referenced from, for example, a corner of the workpiece support material 20 between the spacers 26. In one or more other embodiments, other indicia 25 may be included or added to help end users align a wide variety of sizes and shapes of workpiece materials 28 at different positions or regions within the workpiece support material 20. The indicia 25 on the workpiece support material 20 may also be arranged on the workpiece support material 20 in conjunction with software and sensor functionalities of the cutting machine 10 so that the indicia 25 also provides the cutting machine 10 with alignment data, the type of the workpiece material 28, and/or the size of the workpiece material 28 in order to permit the cutting machine 10 to automatically recognition one or more features of the workpiece 50 that is interfaced with the cutting machine 10.

During use, as shown at FIGS. 5A and 8-10, an end user may insert at least a portion (e.g. a rear cover panel $28_{P2}$) of the workpiece material 28 between the upper barrier layer 22 and the lower guiding layer 24 of the workpiece support material 20. Once inserted, as shown at FIGS. 5B and 10, an end user can fold the workpiece material 28 at the living hinge $28_H$ over so that at least some of a remaining portion (e.g., a front cover panel $28_{P1}$) of the workpiece material 28 is folded at the living hinge $28_H$ over the upper barrier layer 22 of the workpiece support material 20. In some configurations, as shown in FIGS. 5C and 10-11, the portion (e.g., a front cover panel $28_{P1}$) of the workpiece material 28 may be folded over the upper barrier layer 22 and pressed downwardly upon an upper surface of the upper barrier layer 22.

Along these lines, in order to at least temporarily retain a portion (e.g., a front cover panel $28_{P1}$) of the workpiece material 28 on the upper surface of the upper barrier layer 22 of the workpiece support material 20 as shown, some configurations of the workpiece support material 20 may include a pressure sensitive adhesive layer $21_A$ (see, e.g., FIGS. 8 and 8A that may be protected by or covered by the selectively-removable film material 21) or other type of adhesive layer disposed on top of the upper surface of the upper barrier layer 22. In such configurations, the workpiece material 28 may be retained flat against upper surface of the upper barrier layer 22 such that the front cover panel $28_{P1}$ of the workpiece material 28 does not shift or separate from the upper barrier layer 22 when cut or otherwise impinged upon by the tool 19 when the workpiece 50 is arranged within the cutting machine 10. Additionally, or alternatively, an upper surface of the lower guiding layer 24 may also include an adhesive layer, such as a pressure sensitive adhesive layer, so that the portion (a rear cover panel $28_{P2}$) of the workpiece material 28 that is disposed between the upper barrier layer 22 and the lower guiding layer 24 of the workpiece support material 20 is also securely retained there-between. Additionally or alternatively, a lower surface of the upper barrier layer 22 may also include an adhesive layer, such as a pressure sensitive adhesive layer, so that the portion (a rear cover panel $28_{P2}$) of the workpiece material 28 disposed between the upper barrier layer 22 and the lower guiding layer 24 of the workpiece support material 20 is securely retained there-between.

Figure 10A:
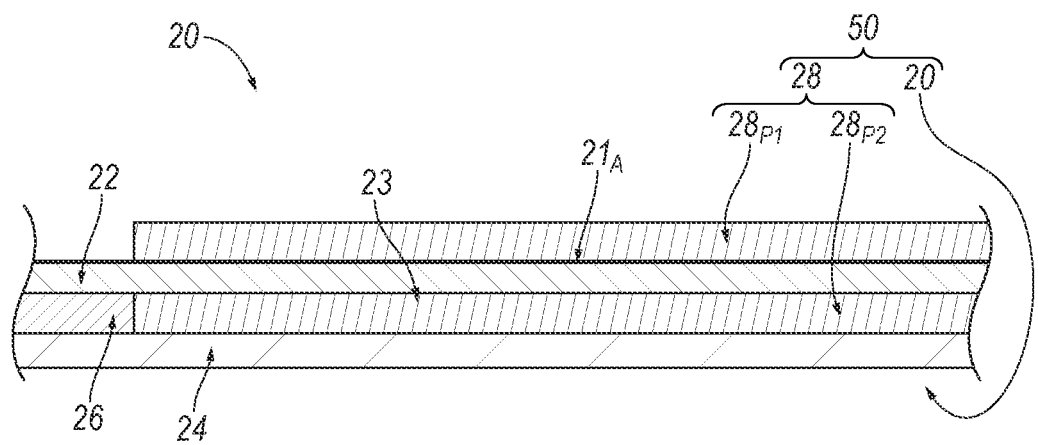
FIG. 10A is a cross-sectional view according to line 10A-10A of FIG. 10.

Accordingly, exemplary configurations of the workpiece support material 20 described above may include one or more adhesive layers (see, e.g., adhesive layer $21_A$) arranged on one or more surfaces of one or both of the upper barrier layer 22 and the lower guiding layer 24. Such adhesive(s) $21_A$ may temporarily retain the workpiece material 28 to the workpiece support material 20 as shown at FIGS. 5C, 10, and 10A. Along these lines, in exemplary embodiments where the upper surface of the upper barrier layer 22 includes an adhesive layer $21_A$, the removable film material 21 may form a protective sheet to protect the adhesive layer $21_A$ when the workpiece support material 20 is not in use. In such configurations, such a film material 21 can be easily removed (as seen at FIGS. 7-8 and 7A-8A) for placement of, for example, the front cover panel $28_{P1}$ of the workpiece material 28 on top and adjacent the upper barrier layer 22 of the workpiece support material 20.

Figure 5C:
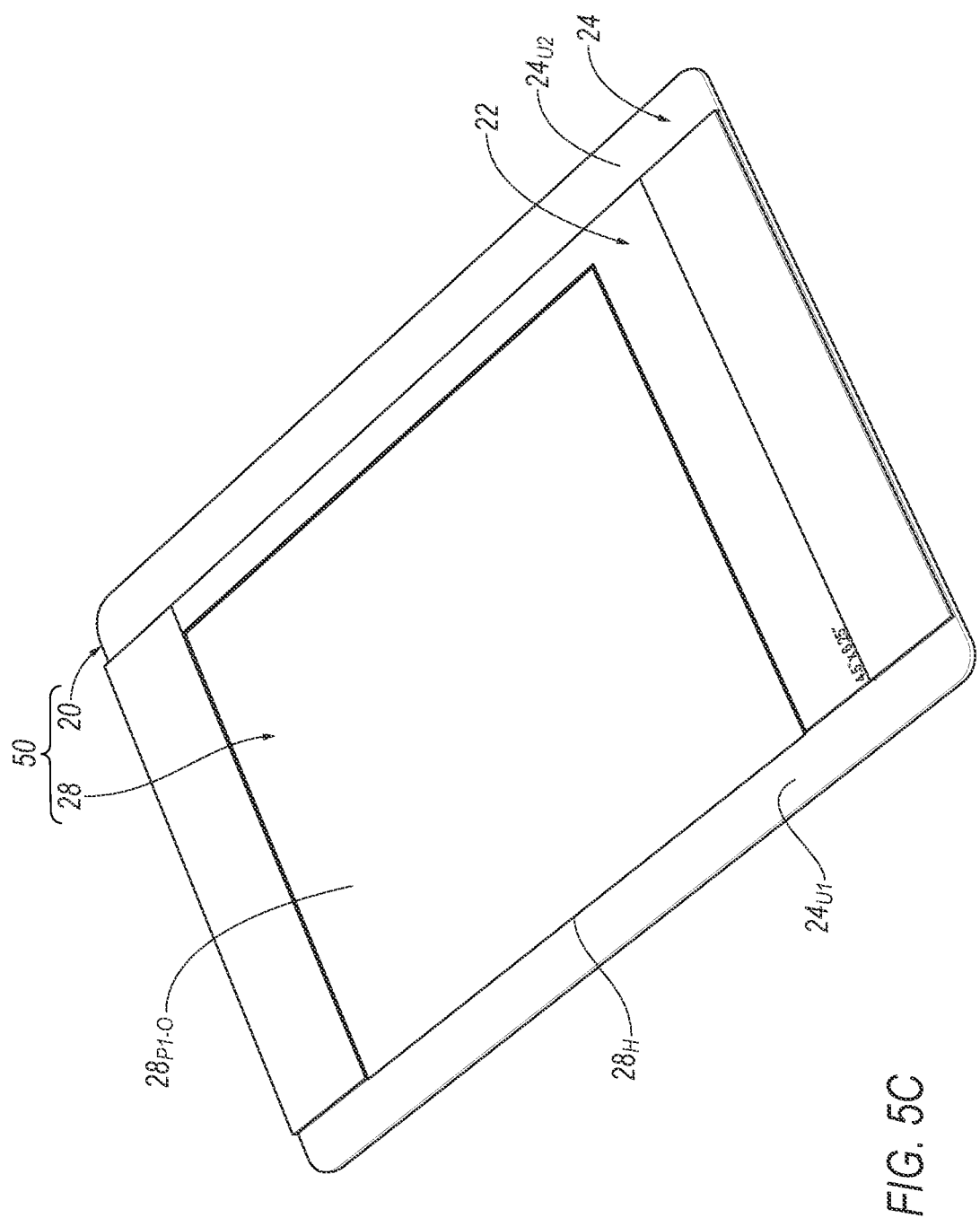
FIG. 5C is a perspective view of the workpiece material of FIG. 5B further interfaced with, and arranged in a third orientation with respect to, the workpiece support material, according to the principles of the present disclosure.
Figure 14:
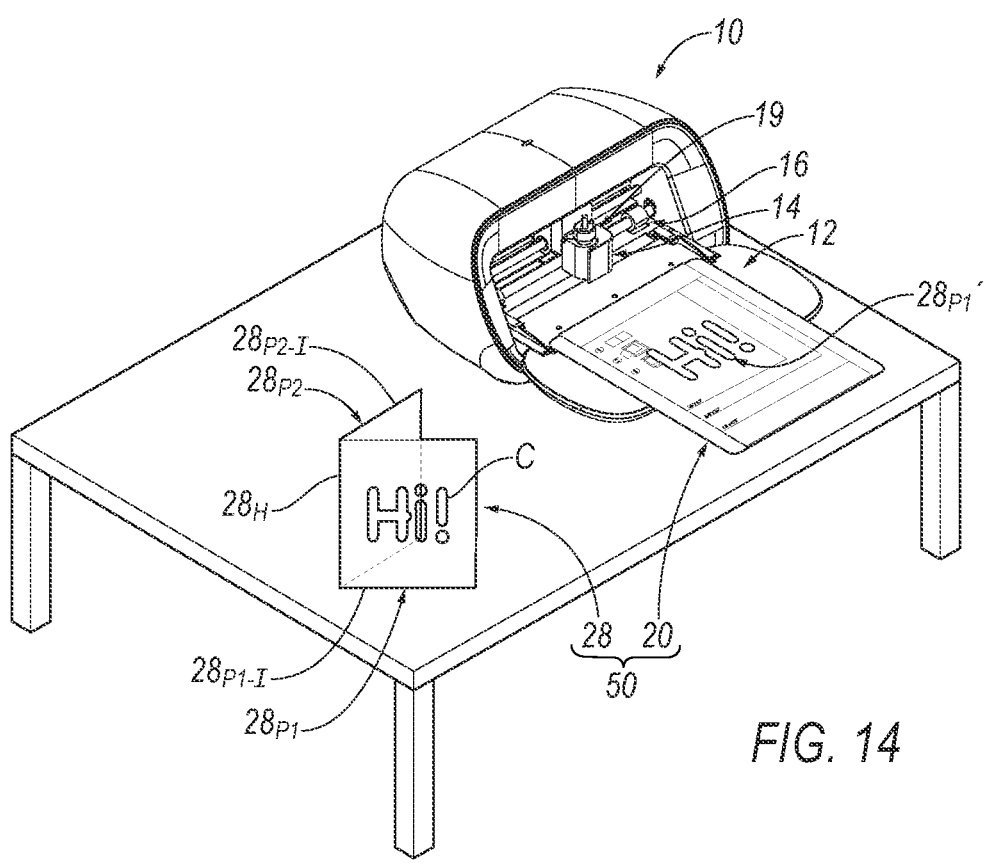
FIG. 14 is a perspective view of an eighth step of using the system according to FIG. 7.

Once the workpiece material 28 is selectively secured to the workpiece support material 20 for defining the workpiece 50 as seen at FIGS. 5A-5C, 7-9, and 7A-9A, the end user may insert the workpiece 50 into the cutting machine at FIGS. 10-11 and 10A-11A such that the cutting machine 10 may conduct work (e.g., cut, scribe, or alter) on the front cover panel $28_{P1}$ of the workpiece material 28 at FIGS. 11-12 and 11A-12A. Once the work (i.e., cutting operation) is completed, as seen at FIGS. 12-13 and 12A-13A, the end user may remove (see, e.g., arrow R at FIG. 13A) a cut portion of the front cover panel $28_{P1}$ of the workpiece material 28 (while a disposable portion $28_{P1}'$ of the front cover panel $28_{P1}$ of the workpiece material 28 remains adhered to the adhesive $21_A$ of the upper barrier layer 22) in order to provide a workpiece material 28 that may define a die-cut card as seen at FIG. 14. Accordingly, once the workpiece material 28 is situated relative to the workpiece support material 20 as shown at FIGS. 5C, 10, and 10A, the workpiece 50 can be either inserted into the cutting machine 10 to alter the exposed portion (e.g., the front cover panel $28_{P1}$) of the workpiece material 28 while the unexposed portion (e.g., the rear cover panel $28_{P2}$) of the workpiece material 28 that is arranged between the upper barrier layer 22 and the lower guiding layer 24 is protected from the tool 19 of the cutting machine 10. As noted above, in some configurations of the workpiece support material 20, because the one or more upwardly-facing surface portions $24_{U1}$, $24_{U2}$ of the lower guiding layer 24 extends laterally beyond the opposite outer edges $22_{E1}$, $22_{E2}$ of the upper barrier layer 22, the entire area of the front cover panel $28_{P1}$ of the workpiece material 28 is accessible by the tool 19 for altering the front cover panel $28_{P1}$ of the workpiece material 28 between the roller assembly 16 of the cutting machine 10 (i.e., rollers or other components of a roller system, such as the roller assembly 16 of the cutting machine 10 do not contact the workpiece material 28 when the workpiece support material 20 is interfaced with the cutting machine 10 that moves the workpiece 50 forwardly-and-backwardly through the cutting machine 10). This exemplary configuration leaves the entire area of the front cover panel $28_{P1}$ of the workpiece material 28 exposed when arranged over the upper barrier layer 22 of the workpiece support material 20.

Figure 6:
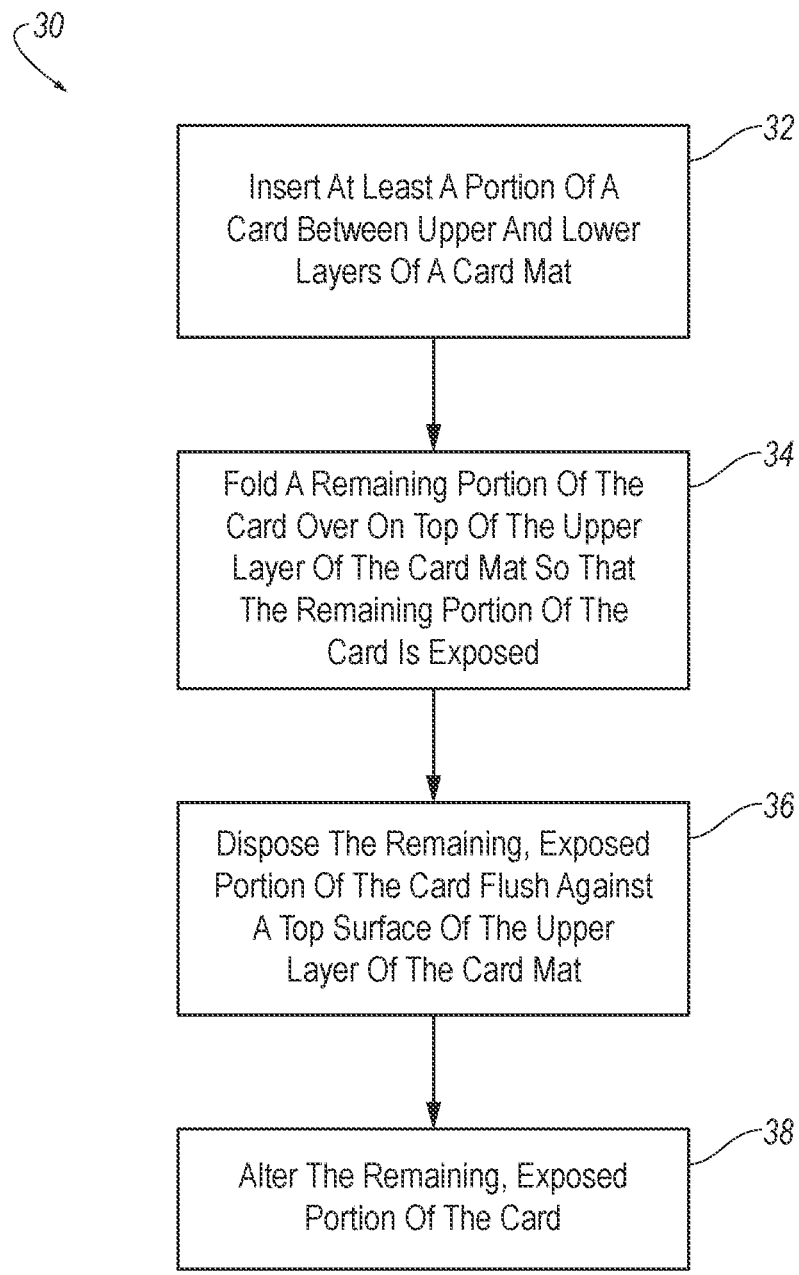
FIG. 6 is a flowchart illustrating an exemplary method of forming a card using a workpiece support material, according to the principles of the present disclosure.
Figure 7:
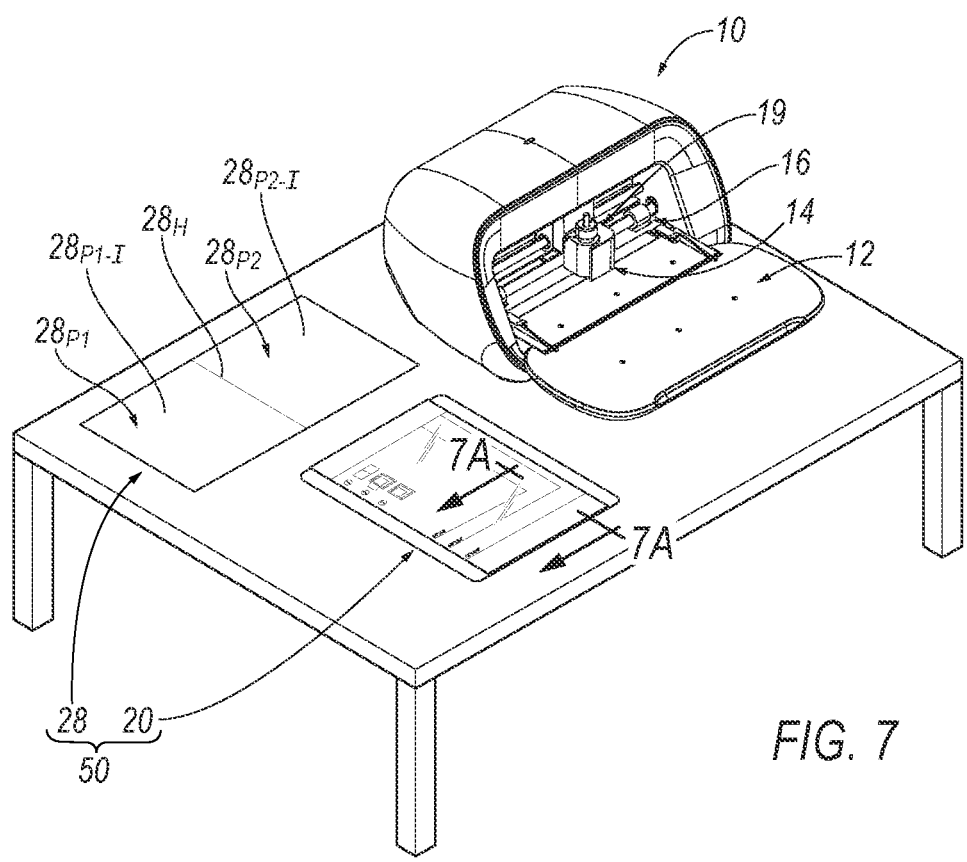
FIG. 7 is a perspective view of a first step of using a system including a cutting machine, a workpiece material and a workpiece support material, according to the principles of the present disclosure.
Figure 7A:
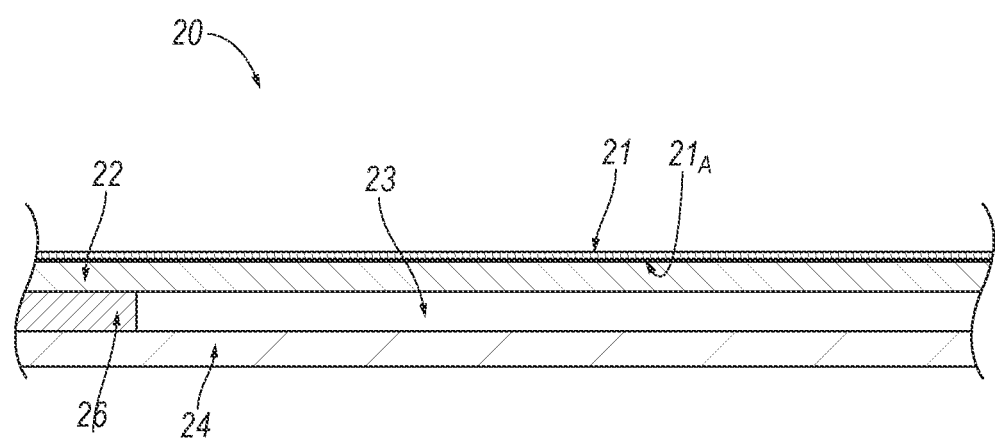
FIG. 7A is a cross-sectional view according to line 7A-7A of FIG. 7.
Figure 8:
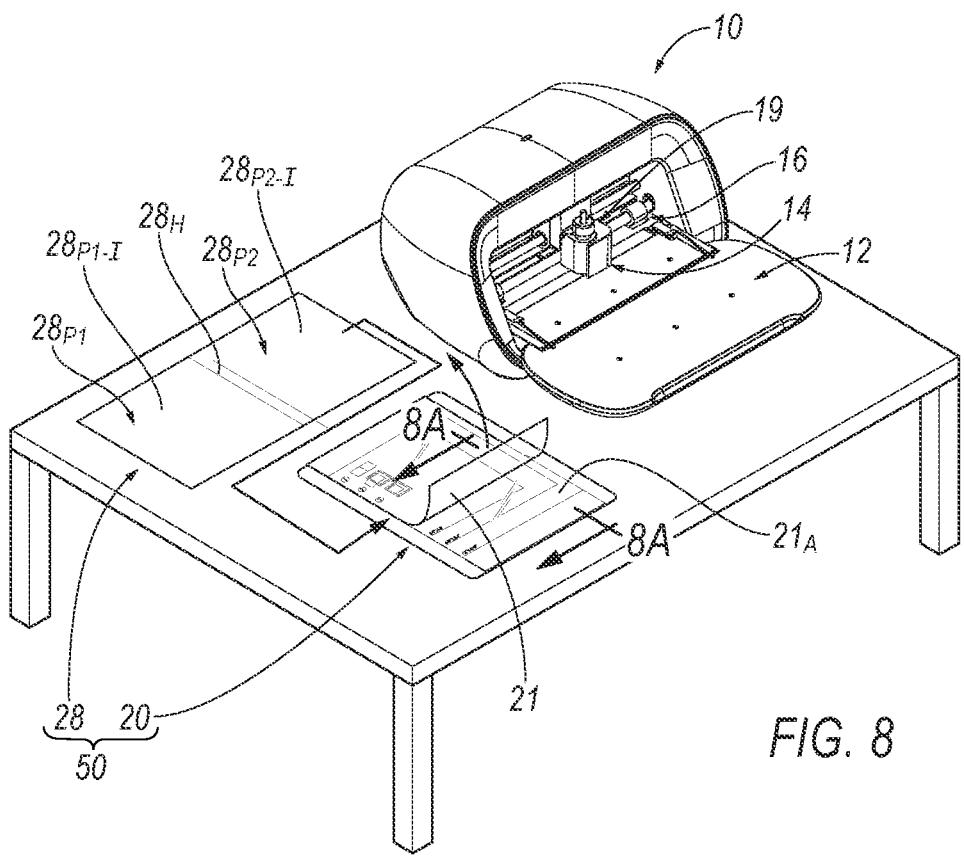
FIG. 8 is a perspective view of a second step of using the system according to FIG. 7.
Figure 8A:
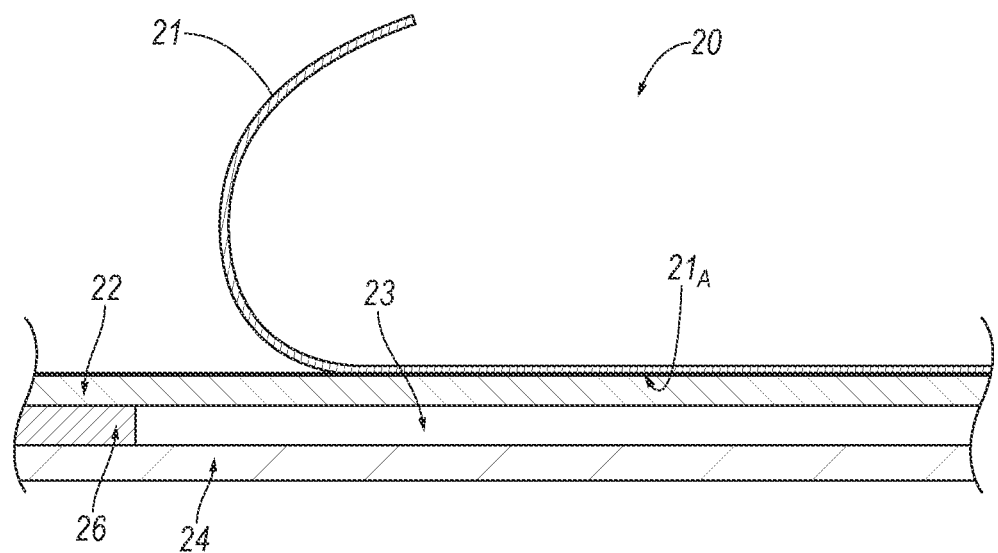
FIG. 8A is a cross-sectional view according to line 8A-8A of FIG. 8.

With reference to FIG. 6, a flowchart of an exemplary method 30 of forming or conducting work on the workpiece material 28 using the workpiece support material 20 and the cutting machine 10 is shown. In some embodiments, a first step 32 may include inserting at least a portion of the workpiece material 28 between the upper barrier layer 22 and the lower guide layer 24 of the workpiece support material 20 (see, e.g., FIG. 5A).

In other embodiments, workpiece support materials 20 having an upper barrier layer 22 that is connected to the lower guiding layer 24 at or near one of the leading end $20_L$ end or the trailing end $20_T$ of the workpiece support material 20, a first step of the method 30 may include peeling the upper barrier layer 22 up and away from the lower guiding layer 24 in order to provide space or expose the void or workpiece-receiving cavity 23 that is configured or sized to receive at least a portion (e.g., the rear cover panel $28_{P2}$) of the workpiece material 28 between the upper barrier layer 22 and the lower guiding layer 24.

In configurations of the workpiece support material 20 that do not include one or more spacers 26, a first step of the method 30 may include firstly separating the upper barrier layer 22 from the lower guiding layer 24 at least enough to insert a portion (e.g., the rear cover panel $28_{P2}$) of the workpiece material 28 there-between. In such an exemplary implementation, separation of the upper barrier layer 22 and the lower guiding layer 24 may include peeling back the upper barrier layer 22 from the lower guiding layer 24. In other implementations, separation of the upper barrier layer 22 and the lower guiding layer 24 may include flexing, bending, or otherwise physically manipulating one of the upper barrier layer 22 and the lower guiding layer 24 away from the other of the upper barrier layer 22 and the lower guiding layer 24 to provide space or expose the void or workpiece-receiving cavity 23 that is configured or sized to receive at least a portion (e.g., the rear cover panel $28_{P2}$) of the workpiece material 28 there-between.

In other instances, the method 30 may include separating the upper barrier layer 22 from the lower guiding layer 24 of the workpiece support material 20 to provide or expose the void or workpiece-receiving cavity 23 that is configured or sized to receive at least a portion (e.g., the rear cover panel $28_{P2}$) of the workpiece material 28; a further step of the method 30 may include returning the upper barrier layer 22 down and against the lower guiding layer 24 with at least a portion (e.g., the rear cover panel $28_{P2}$) of the workpiece material 28 disposed there=between in order to retain the portion of the workpiece material 28 between the upper barrier layer 22 and the lower guiding layer 24.

In at least one exemplary implementation of the method 30, when at least a portion (e.g., the rear cover panel $28_{P2}$) of the workpiece material 28 has been placed between the upper barrier layer 22 and the lower guiding layer 24 as noted above, a further step of the method 30 may include pressing downwardly or providing a downwardly-directed force onto the workpiece support material 20 where the upper surface of the lower guiding layer 24 and/or the lower surface of the upper barrier layer 22 include one or more adhesive layers $21_A$ for securing the workpiece material 28 there-between. By pressing downwardly in this way, the portion (e.g., the rear cover panel $28_{P2}$) of the workpiece material 28 that is disposed between the upper barrier layer 22 and the lower guiding layer 24 of the workpiece support material 20 remain there-between.

In some embodiments, a second step 34 of the method 30 may include folding a remaining portion (e.g., the front cover panel $28_{P1}$) of the workpiece material 28 over or on top of an upper surface of the upper barrier layer 22 of the workpiece support material 20. Such a step 34 may result in the remaining portion (e.g., the front cover panel $28_{P1}$) of the workpiece material 28 being exposed above the upper barrier layer 22 of the workpiece support material 20 when the workpiece 50 is arranged within the cutting machine such that the remaining portion (e.g., the front cover panel $28_{P1}$) of the workpiece material 28 may be arranged opposite the tool 19 such that the tool 19 may conduct work on (e.g., cut) the remaining portion (e.g., the front cover panel $28_{P1}$) of the workpiece material 28 (see, e.g., FIGS. 5B and 10-12).

In other embodiments of the method 30, a third step 36 may include disposing the exposed, remaining portion (e.g., the front cover panel $28_{P1}$) of the workpiece material 28 that has been folded over the upper surface of the upper barrier layer 22 of the workpiece support material 20 against the upper barrier layer 22 in order to be arranged flush against the top surface of the upper barrier layer 22 of the workpiece support material 20 (see, e.g., FIG. 5C).

In exemplary embodiments where a top surface of the upper barrier layer 22 includes an adhesive layer $21_A$, a further step of the method 30 may include pressing the exposed portion (e.g., the front cover panel $28_{P1}$) of the workpiece material 28 downwardly and against the adhesive layer $21_A$ so that the exposed portion (e.g., the front cover panel $28_{P1}$) of the workpiece material 28 remains flush against the upper surface of the upper barrier layer 22 of the workpiece support material 20. Pressing downwardly onto the exposed portion (e.g., the front cover panel $28_{P1}$) of the workpiece material 28 may also secure the portion (e.g., the rear cover panel $28_{P2}$) of the workpiece material 28 disposed between the upper barrier layer 22 and the lower guiding layer 24 of the workpiece support material 20 between the upper barrier layer 22 and the lower guiding layer 24 in embodiments where the upper surface of the lower guiding layer 24 and/or the lower surface of the upper barrier layer 22 also includes one or more adhesive layers $21_A$ for securing a portion (e.g., the rear cover panel $28_{P2}$) of the workpiece material 28 there-between.

In other embodiments of the method 30, a fourth step 38 may include altering the exposed portion (e.g., the front cover panel $28_{P1}$) of the workpiece material 28 (seem e.g., FIGS. 11-14 and 11A-13A), which is disposed on an upper surface of the upper barrier layer 22 of the workpiece support material 20. In such a step, the act of altering may include cutting C (see, e.g., FIGS. 12-14 and 12A-13A), drawing, writing, inscribing, scoring, perforating, and/or otherwise altering the exposed portion (e.g., the front cover panel $28_{P1}$) of the workpiece material 28.

In some embodiments of the method 30, the act of altering the exposed portion (e.g., the front cover panel $28_{P1}$) of the workpiece material 28 may include inserting the workpiece 50 (e.g., collectively, the workpiece support material 20 and the workpiece material 28) into an electronic cutting machine 10 that includes a tool 19 that is configured to impinge downwardly onto the exposed portion (e.g., the front cover panel $28_{P1}$) of the workpiece material 28 and the associated upper barrier layer 22 of the workpiece support material 20.

In at least one implementation of method 30, altering the exposed portion of card 28 may include hand-altering the exposed portion of card 28, including hand-cutting, hand-drawing, hand-writing, hand-scoring, hand-inscribing, hand-perforating, or otherwise altering card 28 by hand.

In some embodiments of the method 30, further steps may include re-inserting the workpiece 50 into the electronic cutting machine 10 in order to perform additional alterations, including those alterations noted above (e.g., cutting, drawing, writing, inscribing, scoring, perforating, or the like) or combinations thereof. In other embodiments, multiple unit of workpiece material 28 may be cut or otherwise altered and then fitted together into a single altered or worked-on workpiece material 28 in order to produce any number of aesthetics and designs on the workpiece material 28. In some embodiments of the method 30, a further step may include inserting and folding more than one workpiece material 28 to the workpiece support material 20 at a time.

Figure 15:
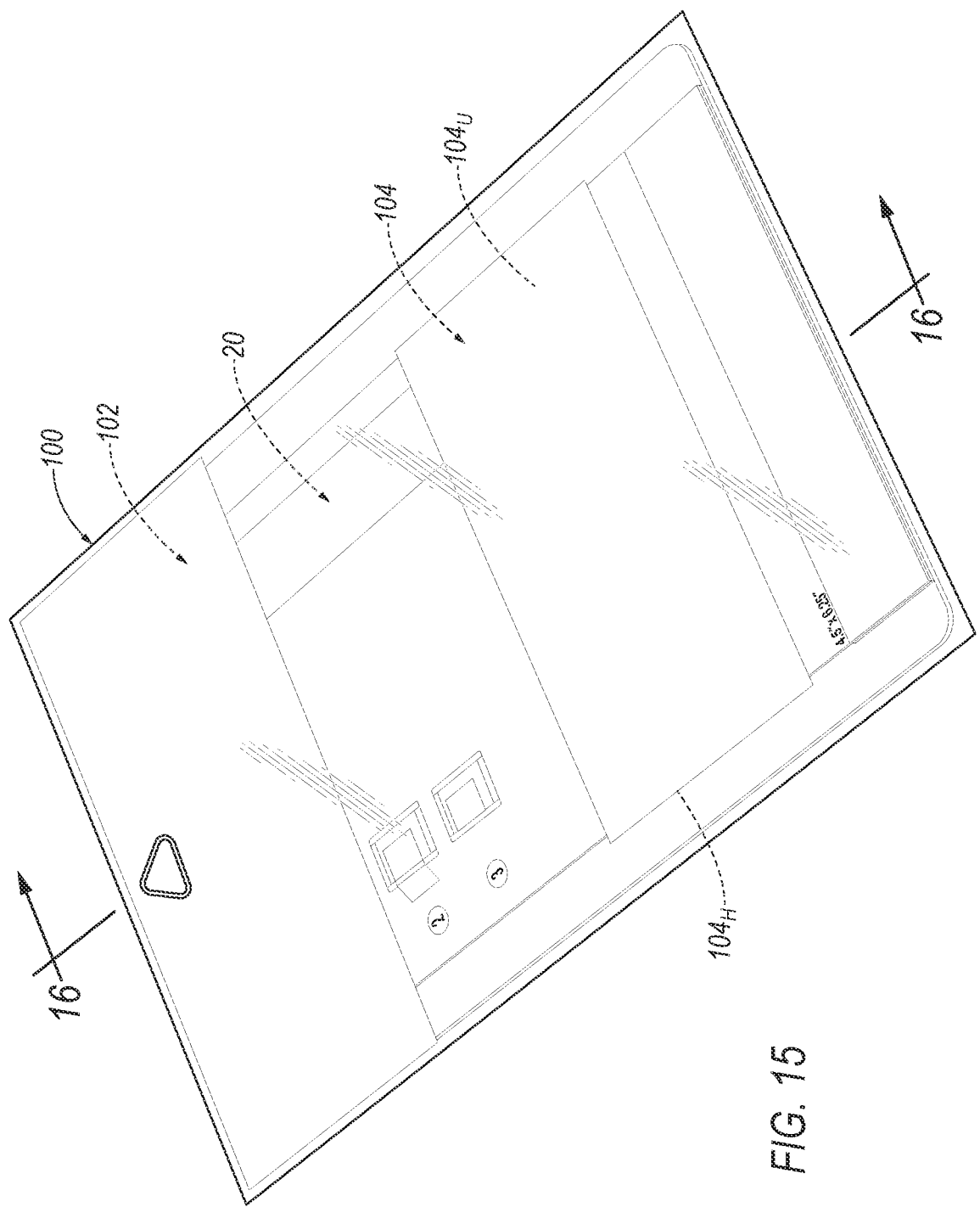
FIG. 15 is a perspective view of an exemplary workpiece material arranged within exemplary packaging, according to the principles of the present disclosure.
Figure 16:
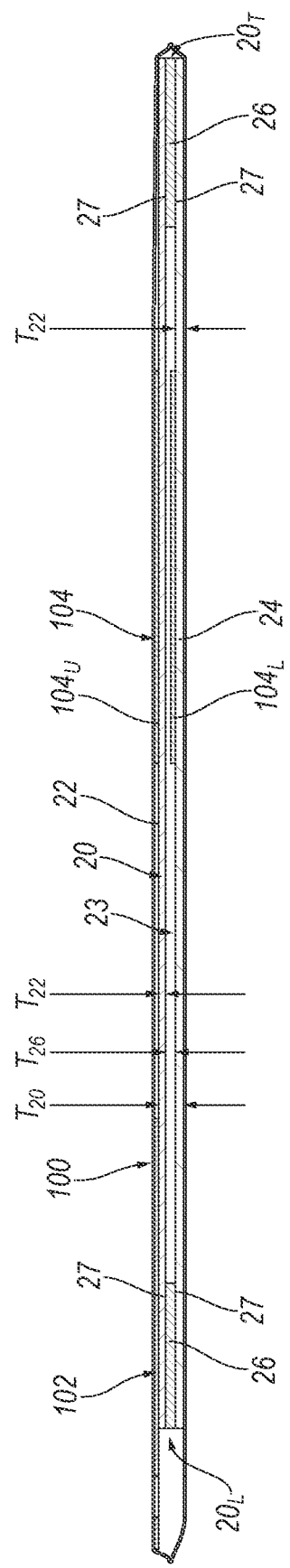
FIG. 16 is a cross-sectional view according to line 16-16 of FIG. 15.

Referring to FIGS. 15 and 16, packaging 100 is shown. The packaging 100 is configured to contain the workpiece support material 20. Arranged at, near, or over the leading end $20_L$ of the workpiece support material 20 is a label portion 102 that is also contained within the packaging 100. The packaging 100 may be formed from a clear material that defines a bag in order to expose surface features and components of the workpiece support material 20 and the label portion 102. In at least one configuration, the label portion 102 may be disposed on the outside of the packaging 100 so that the packaging 100 is at least partially covered by the label portion 102.

In yet other configurations, the packaging 100 may further include one or more sleeve portions 104 (which may alternatively be referred as one or more collars, one or more wrapping portions or the like) that at least partially or fully surrounds the upper barrier layer 22 that is contained within the packaging 100. For example, the sleeve portion 104 may include at least an upper panel portion $104_U$ that is arranged over and at least partially covers a portion of the upper barrier layer 22 of the workpiece support material 20. One or more surfaces of the sleeve portion 104 may include pictures, printed indicia, text, images or the like that may include, but is not limited to, promotional and/or instructive texts and images. The sleeve portion 104 may be removable so as to not interfere with the proper use of workpiece support material 20.

With reference to FIGS. 15 and 16, in some implementations, the sleeve portion 104 defines a "C-shape" (i.e., the sleeve portion 104 may hereinafter be referred to as a "C-shaped sleeve portion."). Accordingly, the C-shaped sleeve portion 104 may be configured in a substantially similar manner as the workpiece material 28 (e.g., the sleeve portion 104 may be alternatively referred to as a "sample card," a "free card," "complementary card," or "test card" that is provided with the workpiece support material 20). In this regard, disposing the sleeve portion 104 about or around the upper barrier layer 22 can indicate the functionality of the support material 20 to the user. In particular, the sleeve portion 104 may be at least partially disposed between the upper barrier layer 22 and the guide layer 24 to show the separability of the upper barrier layer 22 relative to the guide layer 24, thus hinting at the purpose and use of workpiece support material 20 before the end user purchases or opens the packaging 100.

In some configurations, the C-shaped sleeve portion 104 may be include a sheet of material that is folded upon itself to form a living hinge $104_H$ (see, e.g., FIG. 15) that results in the C-shaped sleeve portion 104 including: (1) the upper panel portion $104_U$ (see, e.g., FIGS. 15 and 16) defining an outer surface and an inner surface; and (2) a lower panel portion $104_L$ (see, e.g., FIG. 16) defining an outer surface and an inner surface). Accordingly, as seen at FIG. 16, the upper panel portion $104_U$ may be arranged between a transparent front panel portion of the packaging 100 and the upper barrier layer 22 of the workpiece support material 20 whereas the lower panel portion $104_L$ is disposed within the void or workpiece-receiving cavity 23 as a result of being arranged between the upper barrier layer 22 and the lower guiding layer 24. With reference to FIGS. 15 and 16, the living hinge $104_H$ of the C-shaped sleeve portion 104 may extend across a portion of the thicknesses $T_{22}$ of the upper barrier layer 22. Furthermore, as seen at FIG. 16, a thickness (not shown) of the lower panel portion $104_L$ of the C-shaped sleeve portion 104 may be less than the thickness $T_{26}$ of the spacer 26 (that also defines a thickness, height, or dimension of the void or workpiece-receiving cavity 23). Accordingly, in some configurations, when the C-shaped sleeve portion 104 is interfaced with the workpiece support material 20 as seen at FIGS. 15 and 16, the C-shaped sleeve portion 104 may be defined by a thickness (not shown) that is less than a thickness $T_{20}$ of the workpiece support material 20.

As noted above, each of the embodiments described in the detailed description above may include any of the features, options, and possibilities set out in the present disclosure, including those under the other independent embodiments, and may also include any combination of any of the features, options, and possibilities set out in the present disclosure and figures. Further examples consistent with the present teachings described herein are set out in the following numbered clauses:

Clause 1: A method of forming a card, comprising: providing a card; providing a card mat, comprising: an upper barrier layer; and a lower layer; inserting at least a portion of the card between the upper and lower layers of the card mat; folding a remaining portion of the card over and on top of the upper layer of the card mat, the remaining portion of the card being at least some of a portion of the card that is not disposed between upper and lower layers of the card mat; and altering the remaining portion of the card.

Clause 2: the method of clause 1, further comprising: before altering the remaining portion of the card, disposing the remaining portion of the card flush against an upper surface of the upper layer of the card mat.

Clause 3: The method of any of clauses 1 through 2, further comprising: before inserting at least a portion of the card between the upper and lower layers of the card mat, separating the upper layer of the card mat from the lower layer of the card mat.

Clause 4: The method of any of clauses 1 through 3, wherein altering the remaining portion of the card includes feeding the card and the card mat together into an electronic cutting machine.

Clause 5: The method of any of clauses 1 through 4, wherein: the upper barrier layer is secured to the lower layer at a first end of the card mat; and at least a portion of the upper barrier layer is separable from the lower layer.

Clause 6: The method of clause 5, wherein: the upper barrier layer of the card mat is secured to the lower layer at a second end of the card mat; and the at least a portion of the upper barrier layer that is separable from the lower layer includes a portion of the upper barrier layer disposed between the first and second ends of the card mat where the upper barrier layer is secured to the lower layer.

Clause 7: The method of any of clauses 1 through 6, the card mat further comprising one or more spacers disposed between the upper barrier layer and the lower layer.

Clause 8: A method of forming a card, comprising: inserting a first portion of a card between an upper barrier layer and a lower layer of a card mat; folding a second portion of the card over and on top of the upper barrier layer; and inserting the card and card mat together into an electronic cutting machine with the second portion of the card facing up.

Clause 9: The method of clause 8, further comprising: before inserting the first portion of the card between the upper barrier layer and the lower layer of the card mat, separating at least a portion of the upper barrier layer from the lower layer.

Clause 10: The method of any of clauses 8 through 9, wherein the lower layer of the card mat extends laterally beyond the edges of the upper barrier layer such that a roller assembly of the electronic cutting machine pinches or otherwise contacts lower layer during an actuation of the card mat forward-and-backward through the electronic cutting machine.

Clause 11: A card mat configure to assist in a forming of one or more cards, the card mat comprising: an upper layer; and a lower layer, wherein at least a portion of the upper layer is separable or separated from the lower layer at a distance sufficient to allow at least a portion of a card to be inserted therebetween during use.

Clause 12: The card mat of clause 11, wherein the upper layer is separated from the lower layer by at least one spacer disposed between the upper layer and the lower layer.

Clause 13: The card mat or any of clause 11 through 12, further comprising: a first spacer disposed between first and second layers at a first end of the card mat; and a second spacer disposed between the first and second layers at a second end of the card mat, wherein the first and second spacers are separated from one another by a distance.

Clause 14: The card mat of clause 13, wherein: the upper layer is fixed to the lower layer via the first spacer; and the upper layer is removably secured to the lower layer via the second spacer.

Clause 15: The card mat of any of clauses 11 through 14, further comprising an adhesive layer disposed on a top surface of the upper layer.

Clause 16: The card mat of any of clauses 11 through 15, wherein the upper layer is secured to the lower layer at only one end of the card mat.

Clause 17: The card mat of any of clauses 11 through 13, wherein the upper layer is secured to the lower layer at two opposing ends of the card mat.

Clause 18: The card mat of any of clauses 11 through 17, wherein the upper layer is transparent or semi-transparent.

Clause 19: The card mat of any of clauses 11 through 18, wherein the upper layer is a barrier layer configured to protect the portion of the card disposed between the upper and lower layers of the card mat during use.

Clause 20: A card mat configured to assist in a forming of one or more cards, the card mat comprising: an upper sheet; and a lower sheet, wherein: a first portion of the upper sheet is separable from the second sheet; and a second portion of the upper sheet is secured to the lower sheet via an adhesive layer.

Clause 21: The card mat of clause 20, further comprising one or more spacers disposed between the upper sheet and the lower sheet.

Clause 22: The card mat of any of clauses 20 through 21, further comprising: a first spacer disposed between the upper and lower sheets at a first end of the card mat; and a second spacer disposed between the upper and lower sheets at a second end of the card mat, wherein at least some of the first portion of the upper sheet that is separable from the second sheet extends between the first and second spacers.

Clause 23: The card mat of clause 22, wherein the upper sheet is secured to the lower sheet via the first spacer.

Clause 24: The card mat of clause 23, wherein the upper sheet is secured to the lower sheet via the second spacer.

Clause 25: The card mat of clause 20, wherein the upper sheet is secured to the lower sheet via on or more adhesive layers, including a first adhesive layer disposed between the upper and lower sheets at a first end of the card mat.

Clause 26: The car mat of clause 15, wherein a portion of the upper sheet not secured to the lower sheet is separable from the lower sheet.

Clause 27: The card mat of clause 25, further comprising a second adhesive layer disposed between the upper and lower sheets at a second end of the card mat.

Clause 28: The card mat of clause 27, wherein a portion of the upper sheet not secured to the lower sheet and extending between the first and second adhesive layers is separable from the lower sheet.

Clause 29: The card mat of any of clauses 20 through 28, wherein the lower sheet extends laterally beyond side edges of the lower layer.

Clause 30: A method comprising: inserting a first portion of a workpiece material between an upper layer and a lower layer of a workpiece support material; folding a second portion of the workpiece material over and on top of the upper layer of the workpiece support material, the second portion coupled to the first portion; and inserting the workpiece material and the workpiece support material into an electronic cutting machine.

Clause 31: The method of clause 30, further comprising: disposing the second portion of the workpiece material flush against an upper surface of the upper layer of the workpiece support material.

Clause 32: The method of any of clauses 30 through 31, further comprising: before inserting at least a portion of the workpiece material between the upper layer and the lower layer of the workpiece support material, separating the upper layer of the workpiece support material from the lower layer of the workpiece support material.

Clause 33: The method of any of clauses 30 through 32, further comprising altering the second portion of the workpiece material.

Clause 34: The method of any of clauses 30 through 33, wherein: the upper layer is secured to the lower layer at a first end of the workpiece support material; and a portion of the upper layer is separable from the lower layer.

Clause 35: The method of clause 34, wherein: the upper layer is secured to the lower layer at a second end of the workpiece support material; and the portion of the upper layer that is separable from the lower layer includes a portion of the upper layer disposed between the first end and the second end of the workpiece support material where the upper layer is secured to the lower layer.

Clause 36: The method of any of clauses 30 through 35, wherein the workpiece support material further comprises one or more spacers disposed between the upper layer and the lower layer.

Clause 37: A method comprising: receiving a workpiece into an electronic cutting machine, the workpiece including a workpiece support material and a workpiece material, the workpiece support material including an upper layer and a lower layer opposing the upper layer, the workpiece material including a first portion and a second portion coupled to the first portion, the first portion disposed between the upper layer and the lower layer, and the upper layer disposed between the first portion and the second portion; and altering the second portion of the workpiece material with the electronic cutting machine.

Clause 38: The method of clause 37, wherein the lower layer of the workpiece support material extends laterally beyond edges of the upper layer, the method further comprising: engaging the lower layer with a roller assembly of the electronic cutting machine; and actuating the workpiece support material forward-and-backward through the electronic cutting machine.

Clause 39: A workpiece support material comprising: an upper layer including a first portion and a second portion; and a lower layer opposing the upper layer, wherein the first portion of the upper layer is separable from the lower layer to allow at least a portion of a workpiece material to be inserted therebetween, and wherein the second portion of the upper layer is secured to the lower layer.

Clause 40: The workpiece support material of clause 39, further comprising a spacer disposed between the upper layer and the lower layer.

Clause 41: The workpiece support material of clause 40, wherein the spacer engages the lower layer and the second portion of the upper layer.

Clause 42: The workpiece support material of any of clauses 40 through 41, further comprising: a first spacer disposed between first and second layers at a first end of the workpiece support material; and a second spacer disposed between the first and second layers at a second end of the workpiece support material, wherein the first spacer is separated from the second spacer by a distance.

Clause 43: The workpiece support material of clause 42, wherein: the upper layer is fixed to the lower layer via the first spacer; and the upper layer is removably secured to the lower layer via the second spacer.

Clause 44: The workpiece support material of any of clauses 40 through 43, further comprising an adhesive layer disposed on a top surface of the upper layer.

Clause 45: The workpiece support material of any of clauses 40 through 44, wherein the upper layer is secured to the lower layer at only one end of the workpiece support material.

Clause 46: The workpiece support material of any of clauses 40 through 45, wherein the upper layer is secured to the lower layer at two opposing ends of the workpiece support material.

Clause 47: The workpiece support material of any of clauses 40 through 46, wherein the upper layer is transparent or semi-transparent.

Clause 48: The workpiece support material of any of clauses 40 through 47, wherein the upper layer is a barrier layer configured to protect the portion of the workpiece material disposed between the upper layer and the lower layer of the workpiece support material during use.

Clause 49: A workpiece support material comprising: a lower sheet; and an upper sheet having (i) a first portion separable from the lower sheet and (ii) a second portion secured to the lower sheet via an adhesive layer.

Clause 50: The workpiece support material of clause 49, further comprising one or more spacers disposed between the upper sheet and the lower sheet.

Clause 51: The workpiece support material of any of clauses 49 through 50, further comprising: a first spacer disposed between the upper sheet and the lower sheet at a first end of the workpiece support material; and a second spacer disposed between the upper sheet and lower sheet at a second end of the workpiece support material, wherein at least a portion of the first portion of the upper sheet that is separable from the lower sheet extends between the first and second spacers.

Clause 52: The workpiece support material of clause 51, wherein the upper sheet is secured to the lower sheet at the first spacer.

Clause 53: The workpiece support material of any of clauses 51 through 52, wherein the upper sheet is secured to the lower sheet at the second spacer.

Clause 54: The workpiece support material of any of clauses 49 through 53, further comprising a first adhesive layer secured to the upper sheet and the lower sheet, wherein the first adhesive layer is disposed between the upper sheet and the lower sheet at a first end of the workpiece support material.

Clause 55: The workpiece support material of clause 54, further comprising a second adhesive layer disposed between the upper sheet and the lower sheet at a second end of the workpiece support material.

Clause 56: The workpiece support material of clause 55, wherein a portion of the upper sheet not secured to the lower sheet and extending between the first adhesive layer and the second adhesive layer is separable from the lower sheet.

Clause 57: The workpiece support material of any of clauses 49 through 56, wherein the lower sheet extends laterally beyond side edges of the upper sheet.

Clause 58: The workpiece support material of any of clauses 49 through 57, wherein the first portion of the upper sheet is not secured to the lower sheet.

Clause 59: A kit comprising: a first workpiece material including a first primary portion and a first secondary portion coupled to the first primary portion, the first primary portion defining a first width; a second workpiece material including a second primary portion and a second secondary portion coupled to the second primary portion, the second primary portion defining a second width greater than the first width and; and a workpiece support material including a lower sheet and an upper sheet, the upper sheet selectively separable from the lower sheet to define a cavity therebetween, the cavity configured to separately receive the first primary portion and the second primary portion.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately,"

"about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising:
   inserting a first portion of a workpiece material between an upper layer and a lower layer of a workpiece support material;
   folding a second portion of the workpiece material over and on top of the upper layer of the workpiece support material, the second portion coupled to the first portion; and
   inserting the workpiece material and the workpiece support material into an electronic cutting machine.

2. The method of claim 1, further comprising:
   disposing the second portion of the workpiece material flush against an upper surface of the upper layer of the workpiece support material.

3. The method of claim 1, further comprising:
   before inserting at least a portion of the workpiece material between the upper layer and the lower layer of the workpiece support material, separating the upper layer of the workpiece support material from the lower layer of the workpiece support material.

4. The method of claim 1, further comprising altering the second portion of the workpiece material.

5. The method of claim 1, wherein:
   the upper layer is secured to the lower layer at a first end of the workpiece support material; and
   a portion of the upper layer is separable from the lower layer.

6. The method of claim 5, wherein:
   the upper layer is secured to the lower layer at a second end of the workpiece support material; and
   the portion of the upper layer that is separable from the lower layer includes a portion of the upper layer disposed between the first end and the second end of the workpiece support material where the upper layer is secured to the lower layer.

7. The method of claim 1, wherein the workpiece support material further comprises one or more spacers disposed between the upper layer and the lower layer.

8. A method comprising:
   receiving a workpiece into an electronic cutting machine, the workpiece including a workpiece support material and a workpiece material, the workpiece support material including an upper layer and a lower layer opposing the upper layer, the workpiece material including a first portion and a second portion coupled to the first portion, the first portion disposed between the upper layer and the lower layer, and the upper layer disposed between the first portion and the second portion; and
   altering the second portion of the workpiece material with the electronic cutting machine.

9. The method of claim 8, wherein the lower layer of the workpiece support material extends laterally beyond edges of the upper layer, the method further comprising:
   engaging the lower layer with a roller assembly of the electronic cutting machine; and
   actuating the workpiece support material forward-and-backward through the electronic cutting machine.

* * * * *